US012118128B2

(12) United States Patent
Peng

(10) Patent No.: US 12,118,128 B2
(45) Date of Patent: Oct. 15, 2024

(54) RUNNING A TRUSTED APPLICATION USING A DYNAMIC LIBRARY

(71) Applicant: Huawei Technologies Co., Ltd., Shenzhen (CN)

(72) Inventor: Jianxin Peng, Beijing (CN)

(73) Assignee: HUAWEI TECHNOLOGIES CO., LTD., En (CN)

( * ) Notice: Subject to any disclaimer, the term of this patent is extended or adjusted under 35 U.S.C. 154(b) by 250 days.

(21) Appl. No.: 17/682,034

(22) Filed: Feb. 28, 2022

(65) Prior Publication Data

US 2022/0277108 A1   Sep. 1, 2022

Related U.S. Application Data

(63) Continuation of application No. PCT/CN2020/106685, filed on Aug. 4, 2020.

(30) Foreign Application Priority Data

Aug. 30, 2019 (CN) .......................... 201910817794.3

(51) Int. Cl.
*G06F 21/64* (2013.01)
*G06F 9/445* (2018.01)
(Continued)

(52) U.S. Cl.
CPC .......... *G06F 21/64* (2013.01); *G06F 9/44521* (2013.01); *G06F 21/53* (2013.01);
(Continued)

(58) Field of Classification Search
CPC ...... G06F 21/53; G06F 21/57; G06F 21/6218; G06F 21/64; G06F 21/74; G06F 21/78;
(Continued)

(56) References Cited

U.S. PATENT DOCUMENTS

2014/0223545 A1* 8/2014 Frerebeau ............... G06F 21/54
726/16
2016/0085695 A1* 3/2016 Leslie-Hurd .............. G06F 9/52
711/163
(Continued)

FOREIGN PATENT DOCUMENTS

| CN | 104318182 A | 1/2015 |
| CN | 105447406 A | 3/2016 |

(Continued)

OTHER PUBLICATIONS

B. McGillion, T. Dettenborn, T. Nyman and N. Asokan, "OpenTEE—An Open Virtual Trusted Execution Environment," 2015 IEEE Trustcom/BigDataSE/ISPA, Helsinki, Finland, 2015, pp. 400-407 (IEEE 2015) (Year: 2015).*

(Continued)

*Primary Examiner* — Theodore C Parsons
(74) *Attorney, Agent, or Firm* — Conley Rose, P.C.

(57) ABSTRACT

A trusted application running method applied to a computer system on which a trusted execution environment (TEE) and a rich execution environment (REE) are deployed, where one or more trusted applications (TAs) run on the TEE operating system. The TEE operating system may start a target TA. Then, the target TA may send, to the TEE operating system, a loading request for a target dynamic library supporting the target service. The TEE operating system may load the target dynamic library to memory space of the target TA in response to the loading request. In this way, before the target TA runs the target service, a program module used to support the target service does not need to be loaded to the memory space of the TA, thereby reducing a waste of the memory space of the TA.

20 Claims, 17 Drawing Sheets

(51) Int. Cl.
*G06F 21/53* (2013.01)
*G06F 21/62* (2013.01)
*G06F 21/78* (2013.01)

(52) U.S. Cl.
CPC .......... *G06F 21/6218* (2013.01); *G06F 21/78* (2013.01); *G06F 2221/2149* (2013.01)

(58) Field of Classification Search
CPC ......... G06F 2221/2149; G06F 9/44521; G06F 9/5005
See application file for complete search history.

(56) References Cited

U.S. PATENT DOCUMENTS

| | | | | |
|---|---|---|---|---|
| 2016/0125186 | A1* | 5/2016 | Francois | G06F 21/57 726/1 |
| 2016/0364341 | A1* | 12/2016 | Banginwar | G06F 9/45558 |
| 2017/0289151 | A1* | 10/2017 | Shanahan | G06F 12/0875 |
| 2018/0267726 | A1 | 9/2018 | Sun et al. | |
| 2018/0330081 | A1 | 11/2018 | Hua et al. | |
| 2019/0138712 | A1* | 5/2019 | Margiolas | G06F 21/53 |
| 2020/0019441 | A1 | 1/2020 | Guo et al. | |
| 2020/0089918 | A1 | 3/2020 | Du | |
| 2020/0143041 | A1* | 5/2020 | Jung | G06F 21/71 |
| 2020/0151320 | A1* | 5/2020 | Li | H04L 63/105 |
| 2020/0218821 | A1* | 7/2020 | Liu | H04L 63/0442 |
| 2021/0019393 | A1* | 1/2021 | Michalevsky | G06F 21/57 |
| 2021/0165883 | A1* | 6/2021 | Zhang | G06F 21/74 |

FOREIGN PATENT DOCUMENTS

| | | | | |
|---|---|---|---|---|
| CN | 105630534 | A | 6/2016 | |
| CN | 106845285 | A | 6/2017 | |
| CN | 107038128 | A | 8/2017 | |
| CN | 107153576 | A | 9/2017 | |
| CN | 107220189 | A | 9/2017 | |
| CN | 108021823 | A | 5/2018 | |
| CN | 108154032 | A | 6/2018 | |
| CN | 108959916 | A | 12/2018 | |
| CN | 109086102 | A | 12/2018 | |
| CN | 109426742 | A | 3/2019 | |
| WO | WO-2014168954 | A1 * | 10/2014 | ............ G06F 21/51 |
| WO | WO-2016172944 | A1 * | 11/2016 | ............ G06F 21/62 |
| WO | WO-2017015856 | A1 * | 2/2017 | ............ G06F 9/445 |

OTHER PUBLICATIONS

Mcgillion, Open-TEE (IEEE 2015) (Year: 2015).*
Rodolfo Silva, et al, "DynSGX: A Privacy Preserving Toolset for Dynamically Loading Functions into Intel(R) SGX Enclaves," Oct. 31, 2017, 8 pages, XP055544802.
Robin Klusman, et al, "Practical Implications of Graphene—SGX," Research Project 2, Aug. 13, 2019, 22 pages, XP055955512.

* cited by examiner

RUNNING A TRUSTED APPLICATION USING A DYNAMIC LIBRARY

CROSS-REFERENCE TO RELATED APPLICATIONS

This is a continuation of International Patent Application No. PCT/CN2020/106685, filed on Aug. 4, 2020, which claims priority to Chinese Patent Application No. 201910817794.3, filed on Aug. 30, 2019. The disclosures of the aforementioned applications are hereby incorporated by reference in their entireties.

TECHNICAL FIELD

This application relates to the field of communications technologies, and in particular, to a trusted application running method, an information processing method, a memory allocation method, and an apparatus.

BACKGROUND

With development of the mobile internet, intelligent terminal devices are increasingly widely used. The terminal devices are based on a rich execution environment (REE) and a trusted execution environment (TEE) that provide an open operating environment, to provide rich functions and extensible attributes of the intelligent terminal devices and protect user privacy and information security. The REE is also referred to as a general running environment, and mainly includes a rich operating system (Rich OS) running on a general-purpose processor and a client application (CA) running on the rich OS. The TEE is an independent running environment running outside the REE, and mainly includes a trusted operating system (Trusted OS) and a trusted application (TA) running on the trusted OS. The TEE is isolated from the REE. The REE cannot directly access hardware and software resources of the TEE, for example, TEE memory. The REE can interact with the TEE only through an authorized application programming interface (API). Therefore, the TEE can defend against software attacks that occur on an REE side.

When implementing a specific function, the TA needs to run some code of a code segment in a target file of the TA and access some data of a data segment. Therefore, a program segment (including code and data) corresponding to the function may be logically referred to as a program module corresponding to the function. In the conventional technology, in a process of starting the TA, the TEE operating system loads a program module corresponding to each function of the TA into memory space of the TA. When receiving a running request of a specific service, the TA may run the service by using program modules supporting the service.

As more TAs are deployed in the TEE, functions of the TAs are increasing, and memory space allocated by the TEE operating system to the TAs is increasing. This puts a strain on secure memory in the TEE, which is a limited security resource of the TEE. However, in an existing TA running method, a TA may not receive a running request of a specific service, but each program module supporting the service has been loaded to memory space of the TA. As a result, the memory space of the TA is wasted, and pressure of the secure memory in the TEE is further increased.

SUMMARY

Embodiments of this application provide a trusted application running method, an information processing method, a memory allocation method, and an apparatus, to save memory space of a TA.

To protect user privacy and information security, a computer system in which an REE and a TEE are deployed is increasingly widely used, and a Rich OS, which is also referred to as an REE operating system, is deployed in the REE of the computer system, where one or more CAs are usually deployed on the REE operating system, and where a Trusted OS, which is also referred to as a TEE operating system, is deployed in the TEE of the computer system. One or more TAs are usually deployed on the TEE operating system, and the TA may usually provide one or more services.

A TA running method provided in a first aspect of the embodiments of this application is described in the following by using examples of a specific TA (which is referred to as a target TA) deployed on the TEE operating system and a specific service (which is referred to as a target service) provided by the target TA. It should be noted that this application does not limit that all TAs deployed on the TEE operating system run according to the method provided in this application.

A prerequisite for running the target service by the target TA is that the TEE operating system starts the target TA. More specifically, the TEE operating system starts a main process of the target TA and is configured to support loading a program module of the target service (or a program module used by the target TA to run the target service) to memory space of the target TA.

For example, in a process of starting the target TA, the TEE operating system may load a target file of the target TA to the memory space of the target TA, and create a process of the target TA to execute the target file. A type of the target file may be a shared target file (for example, a .so file), an executable file (for example, a .os file), or another type of file. A specific type of the target file is not limited in this embodiment of this application. For example, in this embodiment of this application, for example, the target file is an executable file. The target file stores a binary code that can be directly loaded to memory for execution. A dynamic library (which is usually a .so file) and an executable file (which is usually a .os file) are usually files in an executable and linkable format (ELF) format.

In this embodiment of this application, when the target file of the target TA is compiled, some or all of program modules supporting the target service are independently compiled into a shared target file, for example, a dynamic library, instead of being copied to the target file. For ease of description, a dynamic library obtained by compiling the program modules is referred to as a target dynamic library, and the target dynamic library includes code of a function or includes a definition of a symbol (for example, a variable or a function call). A reference (for example, an identifier of a reference object) of a symbol in the target dynamic library and other registration information (for example, a symbol table and relocation information) are added to the target file. The TEE operating system may start the target TA in response to a request for creating the target TA. After being started, the target TA may receive a running request of the target service sent by a CA or another TA, or spontaneously start (or generate) a running request of the target service. Then, the target TA may send a loading request to the TEE operating system in response to the running request. The loading request is used to indicate the TEE operating system to load the target dynamic library. The TEE operating system may receive the loading request sent by the target TA. The TEE operating system may load the target dynamic library to the memory space of the target TA in response to the loading request. Then, the target TA may run the target service by using the target dynamic library in the memory space of the target TA.

Beneficial effects of the TA running method provided in the first aspect of the embodiments of this application are analyzed in the following.

(1) In the TA running method provided in the first aspect of the embodiments of this application, after the target TA receives the running request of the target service, the TEE operating system may load, to the memory space of the target TA, the target dynamic library used to support the target service, such that the target TA runs the target service by using the target dynamic library. In this way, in a process in which the TEE operating system starts the target TA or before the target TA receives the running request of the target service, the program module used to support the target service does not need to be loaded to the memory space of the TA, thereby reducing a waste of the memory space of the TA.

(2) The TEE operating system loads the target dynamic library to the target TA, and permission to load the target dynamic library does not need to be configured for the target TA. For example, permission to access a target storage area and configure an attribute does not need to be configured for the target TA. This helps improve security of the TEE. The target storage area stores the target dynamic library, and is storage space other than the memory space of the target TA in the storage area of the TEE.

It should be noted that, that the target TA runs the target service by using the target dynamic library does not limit that the target TA can run the target service by using only the target dynamic library, but limits that the target TA runs the target service by using at least the target dynamic library.

The foregoing "A prerequisite for running the target service by the target TA is that the TEE operating system starts the target TA" does not limit that, in the entire process in which the target TA runs the target service, the TEE operating system needs to start the target TA, but limits that before the target TA runs the target service, the TEE operating system performs at least one step of starting the target TA, such that the target TA enters a running state, and may receive or spontaneously generate a running request of the target service.

For example, a process in which the TEE operating system loads the target dynamic library to the memory space of the target TA may include: The TEE operating system maps or loads the target dynamic library to the memory space of the target TA, and then performs symbol parsing and relocation, such that the target dynamic library is linked to the target file. The symbol parsing may be understood as associating a definition of a symbol in a target dynamic library with a reference of a symbol in the target file. The relocation may be understood as directing a symbol in a target file to a corresponding location in memory based on a memory location of the target dynamic library. In some implementations, the TEE operating system may further configure a corresponding attribute for memory corresponding to the target dynamic library, for example, configure an executable attribute for memory corresponding to a code segment in the target dynamic library, and configure a read-only attribute for memory corresponding to a data segment in the target dynamic library.

It may be considered that memory of the TEE includes memory mapped to a TA, and may be referred to as memory space of a TA or memory of the TA in the embodiments of this application. The memory of the TEE further includes memory mapped to the TEE operating system. In the embodiments of this application, the memory of the TEE may be referred to as memory space of the TEE operating system or TEE operating system memory. Similarly, it may be considered that memory of the REE includes memory mapped to a CA, and may be referred to as memory space of the CA or memory of the CA in the embodiments of this application. The memory of the REE further includes memory mapped to the REE operating system, and may be referred to as memory space of the REE operating system or REE operating system memory in the embodiments of this application. In some embodiments of this application, that the TA runs a service may also be described as that the TA executes a service. In the embodiments of this application, it may be considered that running a service and executing a service have a same meaning.

Based on the method provided in the first aspect of the embodiments of this application, in a first possible implementation of the first aspect of the embodiments of this application, before the TEE operating system receives the loading request, the target dynamic library has already been stored in the memory space of the TEE operating system. That the TEE operating system loads the target dynamic library to the memory space of the target TA in response to the loading request may include: The TEE operating system may load the target dynamic library from the memory space of the TEE operating system to the memory space of the target TA in response to the loading request. High efficiency of loading the target dynamic library to the memory space of the target TA helps improve completion efficiency of the target service.

Based on the method provided in the first aspect of the embodiments of this application, in a second possible implementation of the first aspect of the embodiments of this application, the target dynamic library may be stored in a storage device (for example, a ROM) of the REE. That the TEE operating system loads the target dynamic library to the memory space of the target TA in response to the loading request may include: The TEE operating system may obtain the target dynamic library from the REE operating system in response to the loading request; and after obtaining the target dynamic library, the TEE operating system may load the target dynamic library to the memory space of the target TA.

Because the target dynamic library may be stored in the storage device of the REE, storage resources of the TEE are saved. After receiving the loading request, the TEE operating system may obtain the target dynamic library from the REE operating system. Therefore, if the target TA receives no running request of the target service, the TEE operating system may not need to load the target dynamic library from the storage device of the REE to a storage device of the TEE. This further saves TEE storage resources.

In the second possible implementation of the first aspect of the embodiments of this application, the target dynamic library may be stored in the storage device of the REE. Based on the second possible implementation of the first aspect of the embodiments of this application, in a third possible implementation of the first aspect of the embodiments of this application, that the TEE operating system obtains the target dynamic library from the REE operating system in response to the loading request may include: The TEE operating system may send a transfer request of the target dynamic library to the REE operating system in response to the loading request, and then the TEE operating system may receive the target dynamic library sent by the REE operating system.

Specific content and a content form of the transfer request sent by the TEE operating system are not limited in this implementation, provided that the REE operating system may send the target dynamic library to the TEE operating system in response to the transfer request. For example, the transfer request may include an identifier of the target dynamic library. The REE operating system may search the storage device of the REE for the target dynamic library based on the identifier of the target dynamic library.

In the second possible implementation of the first aspect and the third possible implementation of the first aspect of the embodiments of this application, that "the TEE operating system may obtain the target dynamic library from the REE operating system" does not limit that the TEE operating system obtains, from the REE operating system, the target dynamic library that can be directly loaded to the memory space of the target TA. In some implementations, the TEE operating system may process information obtained from the REE operating system, to obtain the target dynamic library. For example, because security of the REE is relatively poor, the target dynamic library may be encrypted to obtain an encrypted file, and then the encrypted file is stored into the storage device of the REE, to improve security of the target dynamic library stored in the REE. Based on the second possible implementation of the first aspect of the embodiments of this application, in a fourth possible implementation of the first aspect of the embodiments of this application, that the TEE operating system obtains the target dynamic library from the REE operating system in response to the loading request may include: The TEE operating system may obtain the encrypted file from the REE operating system in response to the loading request sent by the target TA; and then decrypt the encrypted file, to obtain the target dynamic library. Based on the third possible implementation of the first aspect of the embodiments of this application, in a fifth possible implementation of the first aspect of the embodiments of this application, that the TEE operating system receives the target dynamic library sent by the REE operating system may include: The TEE operating system receives the encrypted file transferred by the REE operating system; and then the TEE operating system decrypts the encrypted file to obtain the target dynamic library.

In this implementation, information obtained by decrypting the encrypted file is not limited to only the target dynamic library. Therefore, a file obtained after decrypting the encrypted file may be referred to as a decrypted file, and the decrypted file includes at least the target dynamic library. In addition, in some implementations, the decrypted file may further include other information. For example, in a ninth possible implementation of the first aspect of this application in the following, the decrypted file may further include information used to indicate whether a specific TA has permission to invoke a target dynamic library, which is referred to as target permission information for short.

Optionally, in some implementations, the target dynamic library may be further signed in addition to being encrypted and stored in the REE, to improve security of the target dynamic library. The signature is used to verify authenticity of information, and the target dynamic library is encrypted and signed. For example, details may be as follows:

(1) The target dynamic library is encrypted to obtain encrypted information, and then a signature of the encrypted information is generated. The TEE operating system may obtain, from the REE operating system, the encrypted information and a standard signature that correspond to the target dynamic library; first verify whether the signature of the encrypted information is consistent with the standard signature; and if they are inconsistent, determine that the target dynamic library is insecure, and fail to obtain the target dynamic library; and if they are consistent, decrypt the encrypted information, to obtain the target dynamic library.

Alternatively, (2) a signature of the target dynamic library is generated, and then the target dynamic library and the signature of the target dynamic library are encrypted, to obtain encrypted information. The TEE operating system may obtain, from the REE operating system, the encrypted information corresponding to the target dynamic library, and decrypt the encrypted information, to obtain the target dynamic library and a standard signature. The TEE operating system may verify whether the signature of the target dynamic library is consistent with the standard signature; and if they are inconsistent, determine that the target dynamic library is insecure, and determine that the target dynamic library fails to be obtained; or if they are consistent, determine that the target dynamic library is successfully obtained.

Similar to the second possible implementation of the first aspect of the embodiments of this application, based on the method provided in the first aspect of the embodiments of this application or the first possible implementation of the first aspect of the embodiments of this application, in a sixth possible implementation of the first aspect of the embodiments of this application, the target dynamic library may also be stored in the storage device of the REE. A difference mainly lies in that, in the second possible implementation of the first aspect of the embodiments of this application, the target dynamic is obtained by the TEE operating system from the REE operating system in response to the loading request sent by the target TA; however, in the sixth possible implementation of the first aspect of the embodiments of this application, the target dynamic library is sent by an REE side to the TEE operating system in response to a first transfer request sent by the target TA. The following describes the sixth possible implementation of the first aspect of the embodiments of this application.

In the sixth possible implementation of the first aspect of the embodiments of this application, the REE side includes the REE operating system and a CA that sends a running request of the target service to the target TA (which is referred to as a target CA in this embodiment of this application). The target CA deployed on the REE operating system has permission to invoke the target TA to run the target service. After receiving the running request of the target service sent by the target CA, the target TA may send the first transfer request to the target CA. The target CA may send a second transfer request to the REE operating system in response to the first transfer request; and the REE operating system may send the target dynamic library to the TEE operating system in response to the second transfer request. Two implementations are described in the following.

(1) Permission to access a target storage area of the REE is configured for the target CA, the target dynamic library is stored in the target storage area, the target CA may read the target dynamic library from the target storage area in response to the first transfer request and then send the second transfer request to the REE operating system, and the REE operating system sends the target dynamic library read by the target CA to the TEE operating system in response to the second transfer request.

(2) The target dynamic library is stored in the target storage area. The target CA may send the second transfer request to the REE operating system in response to the first transfer request. The REE operating system may read the target dynamic library from the target storage area in response to the second transfer request, and then send the target dynamic library to the TEE operating system.

Specific content and content forms of the first transfer request and the second transfer request are not limited in this implementation, provided that the target CA may send the second transfer request to the REE operating system in response to the first transfer request and the REE operating system may send the target dynamic library to the TEE operating system in response to the second transfer request. For example, both the first transfer request and the second transfer request may include the identifier of the target dynamic library, and the REE operating system may search the storage device of the REE for the target dynamic library based on the identifier of the target dynamic library.

Based on any one of the first aspect or the first possible implementation of the first aspect to the sixth possible implementation of the first aspect of the embodiments of this application, in a seventh possible implementation of the first aspect of the embodiments of this application, in the process of starting the target TA, the TEE operating system may load the target file of the target TA to the memory space of the target TA. The target file records each dynamic library that needs to be used by the target TA in a service running process, for example, records an identifier representing each dynamic library. Each dynamic library recorded in the target file may be stored in the REE, to save storage resources of the TEE. In the process in which the TEE operating system starts the target TA, the TEE operating system may read an identifier or identifiers of one or more dynamic libraries from the target file. Then, the corresponding one or more dynamic libraries are obtained from the REE operating system, and the obtained dynamic libraries are stored into the memory space of the TEE operating system.

The dynamic libraries obtained by the TEE operating system in the process of starting the target TA may be all dynamic libraries recorded in the target file, or may be some dynamic libraries recorded in the target file to save storage resources of the TEE. When the TEE operating system receives the loading request of the target dynamic library, if the target dynamic library has been pre-stored in the TEE operating system, efficiency of loading the target dynamic library to the memory space of the target TA by the TEE operating system is improved.

If the TEE operating system pre-obtains, in the process of starting the target TA, only some dynamic libraries recorded in the target file, the TEE operating system may predict, from the dynamic libraries recorded in the target file, one or more dynamic libraries that have a higher probability of being invoked; and obtain a corresponding dynamic library predicted in the process of starting the target TA, to increase a probability that the pre-obtained dynamic libraries are invoked by the target TA.

Different TAs in the TEE are independent of each other. A TA cannot access a security resource of another TA without authorization. The target dynamic library may be considered as a security resource of the target TA. To improve security of the TEE, based on any one of the first aspect or the first possible implementation of the first aspect to the sixth possible implementation of the first aspect of the embodiments of this application, in an eighth possible implementation of the first aspect of the embodiments of this application, the TEE operating system may set target permission information for the target dynamic library. The target permission information is used to indicate specific TAs that have permission to invoke the target dynamic library or specific TAs that do not have permission to invoke the target dynamic library. For example, the target permission information may include an identifier of a TA that has permission to invoke the target dynamic library. That the TEE operating system loads the target dynamic library to the memory space of the target TA in response to the loading request of the target dynamic library may include: The TEE operating system determines, in response to the loading request of the target dynamic library based on the target permission information, whether the target TA has permission to invoke the target dynamic library. Based on that the target TA has permission to invoke the target dynamic library, the TEE operating system may load the target dynamic library to the memory space of the target TA.

Based on the eighth possible implementation of the first aspect of the embodiments of this application, in a ninth possible implementation of the first aspect of the embodiments of this application, to prevent the target permission information from being tampered with and help the TEE operating system search for the target permission information corresponding to the target dynamic library, the target permission information and the target dynamic library may be jointly encrypted into a same encrypted file. When the TEE operating system needs to obtain the target dynamic library, the TEE operating system may decrypt the encrypted file. The obtained decrypted file includes the target permission information and the target dynamic library. Then, optionally, the TEE operating system may associate and store the target permission information and the target dynamic library into memory space of the TEE operating system.

A TA running method provided in a second aspect of the embodiments of this application is described still by using examples of a specific TA (which is referred to as a target TA) deployed on the TEE operating system and a specific service (which is referred to as a target service) provided by the target TA.

A prerequisite for running the target service by the target TA is that the TEE operating system starts the target TA. More specifically, the TEE operating system starts a main process of the target TA and is configured to support loading a program module of the target service (or a program module used by the target TA to run the target service) to memory space of the target TA. In this embodiment of this application, some or all program modules supporting the target service are encapsulated into a shared target file, to be more specific, a target dynamic library.

In the TA running method provided in the first aspect and the implementations of the first aspect, after the TEE operating system starts the target TA, the target TA sends the loading request of the target dynamic library to the TEE operating system in response to the running request of the target service, and the TEE operating system loads the target dynamic library to the memory space of the target TA in response to the loading request. However, in the TA running method provided in the second aspect of the embodiments of this application, permission to load the dynamic library may be configured for the target TA; the TEE operating system may start the target TA; then, the TEE operating system may provide the target dynamic library for the target TA; and the target TA may load the target dynamic library to the memory space of the target TA in response to a running request of the target service, and run the target service by using the target dynamic library. Beneficial effects of the TA running method provided in the second aspect of the embodiments of this application are analyzed in the following.

(1) In an existing TA running method, in a process of starting a TA, the TEE operating system loads, to memory space of the TA, both a program segment required for starting the TA and a program module corresponding to each function that can be implemented by the TA. Different from the conventional technology, in the TA running method provided in the second aspect of the embodiments of this application, the TEE operating system may provide, for the target TA after starting the target TA, the target dynamic library that needs to be loaded for running the target service, to help not to load the target dynamic library to the memory space of the target TA before the target TA receives the running request of the target service, and help the target TA to load, to the memory space of the target TA after the target TA receives the running request of the target service, the target dynamic library provided by the TEE operating system. This helps reduce a waste of the memory space of the TA.

(2) The target TA loads the target dynamic library. This helps decouple the TA and the TEE operating system in a TEE, facilitates upgrading of the TA and the TEE operating system, and helps reduce operations performed by the TEE operating system.

It should be noted that, that the target TA runs the target service by using the target dynamic library does not limit that the target TA can run the target service by using only the target dynamic library, but limits that the target TA runs the target service by using at least the target dynamic library.

For a process in which the target TA loads the target dynamic library, refer to the description of the process in which the TEE operating system loads the target dynamic library in the first aspect. Details are not described herein again. For example, that permission to load the dynamic library may be configured for the target TA may be understood as: Permission to access and perform attribute (executable, readable, or the like) configuration on a target storage area of the TEE is configured for the target TA, and the target storage area is a storage area for storing the target dynamic library.

For example, that the TEE operating system provides the target dynamic library for the target TA may be understood as: The target dynamic library that needs to be loaded by the target TA needs to be obtained by the TEE operating system, and then the target TA loads, to the memory space of the target TA, the target dynamic library obtained by the TEE operating system; may be understood as: The target TA needs to access memory space of the TEE operating system to load the target dynamic library to the memory space of the target TA; or may be understood as a combination of the foregoing two implementations. For example, the target dynamic library that needs to be loaded by the target TA is obtained by the TEE operating system, and the TEE operating system stores the obtained target dynamic library into the memory space of the TEE operating system. That "the TEE operating system provides the target dynamic library for the target TA" continues to be described in the following implementation of the second aspect of this application.

Based on the method provided in the second aspect of the embodiments of this application, in a first possible implementation of the second aspect of the embodiments of this application, the target TA may send an obtaining request to the TEE operating system in response to the running request of the target service, where the obtaining request is used to indicate the TEE operating system to obtain the target dynamic library. That the TEE operating system provides the target dynamic library for the target TA may include: The TEE operating system may receive the obtaining request sent by the target TA, and the TEE operating system may obtain the target dynamic library after receiving the obtaining request. After obtaining the target dynamic library, the TEE operating system may store the target dynamic library into memory of a TEE, for example, a buffer of the TEE. In this implementation, the TEE operating system may obtain the target dynamic library after the target TA receives the running request of the target service. This helps save the memory of the TEE.

Based on the first possible implementation of the second aspect of the embodiments of this application, in a second possible implementation of the second aspect of this application, the target dynamic library may be stored in a storage device of the REE, to save storage resources of the TEE. In this case, that the TEE operating system obtains the target dynamic library may include: The TEE operating system obtains the target dynamic library from the REE operating system.

In the second possible implementation of the second aspect of this application, that "the TEE operating system may obtain the target dynamic library from the REE operating system" does not limit that the TEE operating system obtains, from the REE operating system, the target dynamic library that can be directly loaded to the memory space of the target TA. In some implementations, the TEE operating system may process information obtained from the REE operating system, to obtain the target dynamic library. For example, because security of the REE is relatively poor, the target dynamic library may be encrypted to obtain an encrypted file, and then the encrypted file is stored into the storage device of the REE, to improve security of the target dynamic library stored in the REE. For example, based on the second possible implementation of the second aspect of the embodiments of this application, in a third possible implementation of the second aspect of this application, that the TEE operating system obtains the target dynamic library from the REE operating system may include: The TEE operating system obtains the encrypted file from the REE operating system; and the TEE operating system decrypts the encrypted file, to obtain a decrypted file, where the decrypted file includes the target dynamic library.

Optionally, in some implementations, the target dynamic library may be further signed in addition to being encrypted and stored in the REE, to improve security of the target dynamic library. The signature is used to verify authenticity of information, and the target dynamic library is encrypted and signed. For example, details may be as follows.

(1) The target dynamic library is encrypted to obtain encrypted information, and then a signature of the encrypted information is generated. The TEE operating system may obtain, from the REE operating system, the encrypted information and a standard signature that correspond to the target dynamic library; first verify whether the signature of the encrypted information is consistent with the standard signature; and if they are inconsistent, determine that the target dynamic library is insecure, and fail to obtain the target dynamic library; and if they are consistent, decrypt the encrypted information, to obtain the target dynamic library.

Alternatively, (2) a signature of the target dynamic library is generated, and then the target dynamic library and the signature of the target dynamic library are encrypted, to obtain encrypted information. The TEE operating system may obtain, from the REE operating system, the encrypted information corresponding to the target dynamic library, and decrypt the encrypted information, to obtain the target dynamic library and a standard signature. The TEE operating system may verify whether the signature of the target dynamic library is consistent with the standard signature; and if they are inconsistent, determine that the target dynamic library is insecure, and determine that the target dynamic library fails to be obtained; or if they are consistent, determine that the target dynamic library is successfully obtained.

Based on the second possible implementation of the second aspect of the embodiments of this application, in a fourth possible implementation of the second aspect of the embodiments of this application, a manner in which the TEE operating system obtains the target dynamic library from the REE operating system is provided, and may include: The TEE operating system sends a transfer request of the target dynamic library to the REE operating system, where the transfer request includes an identifier of the target dynamic library, and the transfer request is used to indicate the REE operating system to send the target dynamic library to the TEE operating system; and then the TEE operating system may receive the target dynamic library sent by the REE operating system.

Based on the first possible implementation of the second aspect of the embodiments of this application, in a fifth possible implementation of the second aspect of this application, the target dynamic library may be stored in a storage device of an REE, to save storage resources of a TEE. In addition, the running request of the target service is sent by a target client application CA deployed on the REE operating system. The target CA has permission to invoke the target service; the target TA may send a first transfer request to the target CA in response to the running request of the target service, the target CA may send a second transfer request to the TEE operating system in response to the first transfer request, and the REE operating system may send the target dynamic library to the TEE operating system in response to the second transfer request. That "the TEE operating system provides the target dynamic library for the target TA" described in the first possible implementation of the second aspect may include: The TEE operating system receives the target dynamic library sent by the REE operating system in response to the second transfer request.

Based on any one of the second aspect or the possible implementations of the second aspect of the embodiments of this application, in a sixth possible implementation of the second aspect of this application, in the process of starting the target TA, the TEE operating system may load a target file of the target TA to the memory space of the target TA. The target file records each dynamic library that needs to be used by the target TA in a service running process, for example, records an identifier representing each dynamic library. Each dynamic library recorded in the target file may be stored in the REE, to save storage resources of the TEE. In the process in which the TEE operating system starts the target TA, the TEE operating system may read an identifier or identifiers of one or more dynamic libraries from the target file. Then, the corresponding one or more dynamic libraries are obtained from the REE operating system, and the obtained dynamic libraries are stored into the memory space of the TEE operating system.

The dynamic libraries obtained by the TEE operating system in the process of starting the target TA may be all dynamic libraries recorded in the target file, or may be some dynamic libraries recorded in the target file to save storage resources of the TEE. When the TEE operating system receives the loading request of the target dynamic library, if the target dynamic library has been pre-stored in the TEE operating system, efficiency of loading the target dynamic library to the memory space of the target TA by the TEE operating system is improved.

If the TEE operating system pre-obtains, in the process of starting the target TA, only some dynamic libraries recorded in the target file, the TEE operating system may predict, from the dynamic libraries recorded in the target file, one or more dynamic libraries that have a higher probability of being invoked; and obtain a corresponding dynamic library predicted in the process of starting the target TA, to increase a probability that the pre-obtained dynamic libraries are invoked by the target TA.

Based on any one of the second aspect or the possible implementations of the second aspect of the embodiments of this application, in a seventh possible implementation of the second aspect of the embodiments of this application, the TEE operating system may store the target dynamic library into the memory space of the TEE operating system, where the target TA may load the target dynamic library by accessing the memory space of the TEE operating system. To improve security of information in the memory space of the TEE operating system, the TEE operating system may set an access permission for the memory space of the TEE operating system. For example, that the TEE operating system provides a target dynamic library for the target TA may include: The TEE operating system receives an access request sent by the target TA, where the access request is used to request to access the memory space of the TEE operating system; the TEE operating system may determine, in response to the access request of the target TA, whether the target TA has permission to access the memory space of the TEE operating system; and if determining that the target TA has permission to access the memory space of the TEE operating system, the TEE operating system may send access-allowed information to the target TA. The access-allowed information is used to notify the target TA to access the memory space of the TEE operating system. After receiving the access-allowed information, the target TA may access the memory space of the TEE operating system, and load the target dynamic library in the memory space of the TEE operating system to the memory space of the target TA.

Based on the seventh possible implementation of the second aspect of the embodiments of this application, in an eighth possible implementation of the second aspect of the embodiments of this application, to further improve security of the target dynamic library stored in the memory space of the TEE operating system, the TEE operating system may invoke permission for the target dynamic library. The access request sent by the target TA needs to indicate a specific file accessed by the target TA in the TEE operating system. If the access request of the target TA is used to request to access the target dynamic library, that the TEE operating system may send access-allowed information to the target TA may include: Based on that the target TA has permission to access the memory space of the TEE operating system, the TEE operating system determines whether the target TA has permission to invoke the target dynamic library, and the TEE operating system sends the access-allowed information to the target TA based on that the target TA has permission to invoke the target dynamic library.

A TA running method provided in a third aspect of the embodiments of this application is described still by using examples of a specific TA (which is referred to as a target TA) deployed on the TEE operating system and a specific service (which is referred to as a target service) provided by the target TA.

A prerequisite for running the target service by the target TA is that the TEE operating system starts the target TA. More specifically, the TEE operating system starts a main process of the target TA and is configured to support loading a program module of the target service (or a program module used by the target TA to run the target service) to memory space of the target TA. In this embodiment of this application, some or all program modules supporting the target service are encapsulated into a shared target file, to be more specific, a target dynamic library.

Similar to the method provided in the second aspect of the embodiments of this application, in the TA running method provided in the third aspect of the embodiments of this application, permission to load a dynamic library may be configured for the target TA, and the target TA may load the target dynamic library to the memory space of the target TA in response to a running request of the target service, and then run the target service by using the target dynamic library. Beneficial effects of the TA running method provided in the third aspect of the embodiments of this application are analyzed in the following.

(1) In an existing TA running method, in a process of starting a TA, the TEE operating system loads, to memory space of the TA, both a program segment required for starting the TA and a program module corresponding to each function that can be implemented by the TA. Different from the conventional technology, in the TA running method provided in the second aspect of the embodiments of this application, after receiving the running request of the target service, the target TA may load the target dynamic library to the memory space of the target TA. In this case, before receiving the running request of the target service, the target TA may not need to load the target dynamic library to the memory space of the target TA. This helps reduce a waste of the memory space of the target TA.

(2) The target TA loads the target dynamic library. This helps decouple the TA and the TEE operating system in a TEE, facilitates upgrading of the TA and the TEE operating system, and helps reduce operations performed by the TEE operating system.

It should be noted that, that the target TA runs the target service by using the target dynamic library does not limit that the target TA can run the target service by using only the target dynamic library, but limits that the target TA runs the target service by using at least the target dynamic library.

For example, that permission to load the dynamic library may be configured for the target TA may be understood as: Permission to access and perform attribute (executable, readable, or the like) configuration on a target storage area of the TEE is configured for the target TA, and the target storage area is a storage area for storing the target dynamic library.

Based on the method provided in the third aspect of the embodiments of this application, in a first possible implementation of the third aspect of the embodiments of this application, the target dynamic library loaded by the target TA is provided by the TEE operating system, and that the target TA loads the target dynamic library to the memory space of the target TA may be: The target TA loads, to the memory space of the target TA, the target dynamic library provided by the TEE operating system.

For example, that the target dynamic library that needs to be loaded by the target TA is provided by the TEE operating system may be understood as: The target dynamic library that needs to be loaded by the target TA needs to be obtained by the TEE operating system, and then the target TA loads, to the memory space of the target TA, the target dynamic library obtained by the TEE operating system; may be understood as: The target dynamic library that needs to be loaded by the target TA is stored in memory space of the TEE operating system by the TEE operating system, and the target TA needs to access the memory space of the TEE operating system to load the target dynamic library to the memory space of the target TA; or may be understood as a combination of the foregoing two implementations. For example, the target dynamic library that needs to be loaded by the target TA is obtained by the TEE operating system, and the TEE operating system stores the obtained target dynamic library into the memory space of the TEE operating system. For that the TEE operating system provides the target dynamic library for the target TA, refer to the corresponding implementation of the second aspect of this application. Details are not described herein again.

For example, a process in which the target TA loads the target dynamic library to the memory space of the target TA may include: The target TA maps or loads the target dynamic library to the memory space of the target TA, parses and relocates a symbol in the target dynamic library, and configures a corresponding attribute for memory corresponding to the target dynamic library. For example, an executable attribute is configured for memory corresponding to a code segment in the target dynamic library, and a read-only attribute is configured for memory corresponding to a data segment in the target dynamic library.

Based on the first possible implementation of the third aspect of the embodiments of this application, in a second possible implementation of the third aspect of the embodiments of this application, that the target TA loads the target dynamic library to the memory space of the target TA may include: The target TA may send an obtaining request to the TEE operating system, where the obtaining request is used to request the TEE operating system to obtain the target dynamic library; and the target TA may load, to the memory space of the target TA after the TEE operating system obtains the target dynamic library, the target dynamic library obtained by the TEE operating system. After receiving the running request of the target service, the target TA may request the TEE operating system to obtain the target dynamic library. Therefore, the TEE operating system may obtain the target dynamic library after the target TA receives the running request of the target service. This helps save memory of the TEE.

Based on the second possible implementation of the third aspect of the embodiments of this application, in a third possible implementation of the third aspect of the embodiments of this application, the target dynamic library may be stored in a storage device of the REE, to save storage resources of the TEE. The target dynamic library that needs to be loaded by the target TA may be obtained by the TEE operating system from the REE operating system.

Based on the first possible implementation of the third aspect of the embodiments of this application, in a fourth possible implementation of the third aspect of the embodiments of this application, the target dynamic library may be stored in a storage device of the REE, to save storage resources of the TEE. In addition, the running request of the target service is sent by a target client application CA deployed on the REE operating system. The target CA has permission to invoke the target service. That the target TA loads the target dynamic library to the memory space of the target TA may include: The target TA may send a first transfer request to the target CA in response to the running request of the target service, the target CA may send a second transfer request to the TEE operating system in response to the first transfer request, and the REE operating system may send the target dynamic library to the TEE operating system in response to the second transfer request. Then, the target TA may load, to the memory space of the target TA, the target dynamic library received by the TEE operating system.

Based on any one of the first to the fourth possible implementations of the third aspect of the embodiments of this application, in a fifth possible implementation of the third aspect of the embodiments of this application, that the TEE operating system provides the target dynamic library for the target TA may be understood as: The TEE operating system stores the target dynamic library into the memory space of the TEE operating system. That the target TA loads, to the memory space of the target TA, the target dynamic library provided by the TEE operating system may include: The target TA loads the target dynamic library from the memory space of the TEE operating system to the memory space of the target TA.

Based on the fifth possible implementation of the third aspect of the embodiments of this application, in a sixth possible implementation of the third aspect of the embodiments of this application, the TEE operating system may store the target dynamic library into the memory space of the TEE operating system. The target TA may load the target dynamic library by accessing the memory space of the TEE operating system. To improve security of information in the memory space of the TEE operating system, the TEE operating system may set an access permission for the memory space of the TEE operating system. That the target TA loads the target dynamic library from the memory space of the TEE operating system to the memory space of the target TA may include: The target TA sends an access request to the TEE operating system, where the access request is used to request to access the memory space of the TEE operating system; the TEE operating system may determine, based on the access request, whether the target TA has permission to access the memory space of the TEE operating system; if the target TA has permission to access the memory space of the TEE operating system, the TEE operating system may send access-allowed information to the target TA; and the target TA may access the memory space of the TEE operating system based on the access-allowed information sent by the TEE operating system and received by the target TA, and load the target dynamic library in the memory space of the TEE operating system to the memory space of the target TA.

In the conventional technology, if a file required by the TEE is stored in the storage device of the REE, the CA may obtain a file required by the TEE, and then send the obtained file to the TEE operating system. A fourth aspect of the embodiments of this application provides an information processing method applied to the foregoing computer system. A function of obtaining a required file for a TEE is added to a TEE operating system. This helps reduce CA development difficulty. For example, an REE operating system may obtain a target file in response to a transfer request, and then send the obtained target file to the TEE operating system, where the transfer request is used to indicate the REE operating system to send the target file to the TEE operating system.

Based on the method provided in the fourth aspect, in a first possible implementation of the fourth aspect of the embodiments of this application, the target file indicated in the transfer request may be a target dynamic library. The target dynamic library is a dynamic library that needs to be invoked by a target TA to run a target service, and is stored in a storage device of an REE. The target TA is a TA deployed on the TEE operating system, and the target service is a service provided by the target TA. The REE operating system may provide, for the TEE operating system, a dynamic library that needs to be invoked when a TA runs a service. This helps load, to memory space of the TA dynamically, a program segment required by the TA, thereby saving memory space of the TA.

Based on the first possible implementation of the fourth aspect, in a second possible implementation of the fourth aspect, the transfer request received by the REE operating system may be sent by the TEE operating system.

Based on the first possible implementation of the fourth aspect, in a third possible implementation of the fourth aspect, the transfer request received by the REE operating system may be sent by a target client application CA, and the target CA has permission to invoke the target service.

For the first, the second, and the third possible implementations of the fourth aspect of this application, refer to the corresponding solutions provided in the first aspect to the fourth aspect of the embodiments of this application. Details are not described herein again.

In the computer system in which the rich execution environment REE and a trusted execution environment TEE are deployed, the TEE and the REE share a memory device. A part of memory is usually allocated to the TEE according to a proportion, and the TEE configures an attribute of the part of memory as secure memory to be used by a process in the TEE; and configures an attribute of another part of memory as non-secure memory to be used by a process in the REE. The process in the REE (for example, the REE operating system or the CA) can access only the non-secure memory, and the process in the TEE (for example, the TEE operating system or the TA) can access only the secure memory. In the conventional technology, service logic coordination is implemented between a CA and a TA. When the TA requires large memory, the CA applies for memory from the REE operating system, and sends information about the applied memory (for example, an address of the memory) to the TA, and the TEE operating system allocates the memory to the TA for use. If an exception occurs, for example, the CA is killed abnormally, the REE operating system reclaims the memory allocated to the CA. Because the memory is occupied by the TA, if the REE operating system allocates the memory to another process of the REE operating system for use, a memory access exception is caused, and stability of the computer system is reduced.

To reduce a memory access exception and improve stability of a computer system, a fifth aspect of the embodiments of this application provides a memory processing method applied to a computer system. An REE operating system is deployed in the REE in the computer system, a TEE operating system is deployed in the TEE in the computer system, and one or more TAs are deployed on the TEE operating system. The memory allocation method provided in the fifth aspect of this application may include: The TEE operating system may send a first memory request to the REE operating system, where the first memory request is used to apply for memory from the TEE operating system; the REE operating system may allocate memory (which is referred to as target memory) to the TEE operating system in response to the first memory request, and send memory allocation information to the TEE operating system, where the memory allocation information is used to indicate that the memory allocated to the TEE operating system is the target memory, for example, the memory allocation information may include an address of the target memory; and the TEE operating system may configure the target memory as secure memory. The target memory is allocated by the REE operating system to the TEE operating system, and a probability that an exception occurs in the TEE operating system is relatively low. Therefore, it is not prone to cause a memory access exception. This helps improve stability of the computer system.

Based on the method provided in the fifth aspect of the embodiments of this application, in a first possible implementation of the fifth aspect of the embodiments of this application, the TEE operating system may apply for memory from the REE operating system for the TA. Before the TEE operating system sends the first memory request to the REE operating system, the memory allocation method further includes: The TEE operating system obtains a second memory request sent by the target TA, where the target TA is any TA in one or more TAs deployed on the TEE operating system, and the second memory request is used to apply for memory from the TEE operating system. It should be noted that, this implementation does not limit that the TEE operating system needs to send the first memory request to the REE operating system when obtaining the second memory request sent by the target TA. For example, after receiving the second memory request, the TEE operating system may determine whether the secure memory in the TEE is sufficient. If the secure memory in the TEE is sufficient, the secure memory in the TEE may be allocated to the target TA. If the secure memory in the TEE is insufficient, the TEE may apply for memory from the REE operating system.

Based on the first possible implementation of the fifth aspect of the embodiments of this application, in a second possible implementation of the fifth aspect of the embodiments of this application, after the TEE operating system configures the target memory as the secure memory, the memory allocation method may further include: The TEE operating system allocates the target memory to the target TA. That the TEE operating system allocates the target memory to the target TA may be further understood as: The TEE operating system maps the target memory to the target TA.

Based on the first or the second possible implementation of the fifth aspect, in a third possible implementation of the fifth aspect, the target service is a service provided by the target TA. After receiving the running request of the target service, if memory space of the target TA is insufficient to run the target service, the target TA may send a second memory request to the TEE operating system, where the second memory request is used to apply, from the TEE operating system, for memory required by the target TA to run the target service.

Based on any one of the first to the third possible implementations of the fifth aspect, in a fourth possible implementation of the fifth aspect, the memory applied for by the TEE operating system from the REE operating system may be greater than the memory applied by the target TA to the TEE operating system, that is, the memory applied for by the first memory request is greater than the memory applied for by the second memory. This helps reduce a quantity of times for which the target TA applies for memory from the TEE operating system, reduce operations performed by the target TA and the TEE operating system, and save computing resources of the computer system.

Based on the second possible implementation of the fifth aspect, in a fifth possible implementation of the fifth aspect, after the TEE operating system allocates the first memory to the target TA, the memory allocation method may further include: The TEE operating system may receive a memory release request sent by the target TA (For ease of differentiation, the memory release request sent by the target TA herein is referred to as a TA memory release request), where the TA memory release request is used to request the TEE operating system to release the target memory; and the TEE operating system may release the target memory in response to the TA memory release request. That the TEE operating system releases the target memory may be understood as: The TEE operating system cancels mapping between the target memory and the target TA.

Based on the fifth possible implementation of the fifth aspect, in a sixth possible implementation of the fifth aspect, after the TEE operating system releases the target memory, the memory allocation method may further include: The TEE operating system configures the target memory as non-secure memory; and then the TEE operating system may send a TEE memory release request to the REE operating system, where the TEE memory release request is used to request the REE operating system to release the target memory. After receiving the TEE memory release request, the REE operating system may release the target memory. That the REE operating system releases the target memory may be understood as: The REE operating system cancels mapping between the target memory and the TEE operating system.

It should be noted that after the TEE operating system releases the target memory, the target memory is in an idle state, and the TEE operating system may not allocate the target memory to a process in the TEE again for use, but immediately configure the target memory as non-secure memory and return the target memory to the REE operating system. Alternatively, after the TEE operating system releases the target memory, the TEE operating system may allocate the target memory to a process in the TEE again for use, and delay returning the target memory to the REE operating system.

Any one of the first to the sixth possible implementations of the fifth aspect of the embodiments of this application may be applied to the TA running method in the first aspect or the possible implementations of the first aspect of the embodiments of this application, the TA running method in the second aspect or the possible implementations of the second aspect of the embodiments of this application, or the TA running method in the third aspect or the possible implementations of the third aspect of the embodiments of this application.

From a perspective of functional modules, a person skilled in the art may separately perform functional module division on the target CA, the REE operating system, the TEE operating system, and the target TA according to the foregoing method embodiments. For example, division into the functional modules is performed in correspondence with the functions. Alternatively, two or more functions may be integrated into one functional module. The foregoing integrated functional module may be implemented in a form of hardware, or may be implemented in a form of a software functional unit.

For example, according to the solution provided in the first aspect, when division into the functional units is performed in an integrated manner, a sixth aspect of the embodiments of this application provides a TEE operating system. The TEE operating system may include: a startup module configured to start a target TA, where the target TA is any TA in the one or more TAs; a receiving module configured to receive a loading request sent by the target TA in response to a running request of a target service, where the loading request is used to indicate to load a target dynamic library, and the target service is a service provided by the target TA; and a loading module configured to load the target dynamic library to memory space of the target TA in response to the loading request, where the target dynamic library is used to support running of the target service.

In a possible implementation, the loading module is configured to load the target dynamic library from memory space of the TEE operating system to the memory space of the target TA.

In a possible implementation, the loading module includes: a TEE communications unit configured to obtain the target dynamic library from the REE operating system; and a dynamic library loading unit configured to load the target dynamic library to the memory space of the target TA.

In a possible implementation, the TEE communications unit is configured to: send a transfer request of the target dynamic library to the REE operating system, where the transfer request includes an identifier of the target dynamic library, and the transfer request is used to indicate the REE operating system to send the target dynamic library to the TEE operating system; and receive the target dynamic library sent by the REE operating system.

In a possible implementation, the TEE communications unit is configured to: obtain an encrypted file from the REE operating system; and decrypt the encrypted file to obtain a decrypted file, where the decrypted file includes the target dynamic library.

In a possible implementation, the startup module is configured to: obtain one or more dynamic libraries from the REE operating system, and store the one or more dynamic libraries into the memory space of the TEE operating system, where the one or more dynamic libraries are recorded in a target file of the target TA. Optionally, the target file is an executable file of the target TA.

In a possible implementation, the loading module is configured to: determine, based on target permission information, whether the target TA has permission to invoke the target dynamic library; and load the target dynamic library to the memory space of the target TA based on that the target TA has permission to invoke the target dynamic library.

In a possible implementation, the TEE operating system further includes a TEE memory module. The TEE memory module is configured to: obtain a memory request sent by the target TA in response to the running request of the target service, where the memory request is used to apply to the TEE operating system for memory required for running the target service; obtain memory allocation information from the REE operating system in response to the memory request, where the memory allocation information is used to indicate the REE operating system to allocate first memory to the TEE operating system; and allocate the first memory to the target TA.

In a possible implementation, the TEE memory module is configured to: configure the first memory as secure memory; and allocate, to the target TA, the first memory configured as the secure memory.

In a possible implementation, the TEE memory module is further configured to: after allocating the first memory to the target TA, receive a TA memory release request sent by the target TA, where the TA memory release request is used to request the TEE operating system to release the first memory; and release the first memory in response to the TA memory release request.

In a possible implementation, the TEE memory module is configured to: configure the first memory as non-secure memory; and release the first memory configured as the non-secure memory.

In a possible implementation, the TEE memory module is further configured to: after releasing the first memory, send a TEE memory release request to the REE operating system, where the TEE memory release request is used to request the REE operating system to release the first memory.

For example, according to the solution provided in the second aspect of the summary, when division into the functional units is performed in an integrated manner, a seventh aspect of this application provides a TEE operating system. The TEE operating system may include a startup module configured to start a target TA, where the target TA is any TA in the one or more TAs; and a dynamic library providing module configured to provide a target dynamic library for the target TA, where the target dynamic library is loaded by the target TA to memory space of the target TA, to support the target TA in running a target service, and the target service is a service provided by the target TA.

In a possible implementation, the dynamic library providing module may include: an obtaining request receiving unit configured to receive an obtaining request sent by the target TA in response to a running request of the target service, where the obtaining request is used to indicate the TEE operating system to obtain the target dynamic library; and a dynamic library obtaining unit configured to obtain the target dynamic library in response to the obtaining request.

In a possible implementation, the dynamic library obtaining unit is configured to obtain the target dynamic library from the REE operating system.

In a possible implementation, the dynamic library obtaining unit is configured to: send a transfer request of the target dynamic library to the REE operating system, where the transfer request includes an identifier of the target dynamic library, and the transfer request is used to indicate the REE operating system to send the target dynamic library to the TEE operating system; and receive the target dynamic library sent by the REE operating system.

In a possible implementation, the dynamic library obtaining unit is configured to: obtain an encrypted file from the REE operating system; and decrypt the encrypted file to obtain a decrypted file, where the decrypted file includes the target dynamic library.

In a possible implementation, the dynamic library providing module is configured to receive the target dynamic library sent by the REE operating system in response to a second transfer request, where a running request of the target service is sent by a target client application CA deployed on the REE operating system, the target CA has permission to invoke the target service, the second transfer request is sent to the REE operating system by the target CA in response to a first transfer request, and the first transfer request is sent to the target CA by the target TA in response to the running request of the target service.

In a possible implementation, the startup module includes: obtaining one or more dynamic libraries from the REE operating system, and storing the one or more dynamic libraries into memory space of the TEE operating system, where the one or more dynamic libraries are recorded in a target file of the target TA. Optionally, the target file is an executable file of the target TA.

In a possible implementation, the dynamic library providing module includes: an access request receiving unit configured to receive an access request sent by the target TA, where the access request is used to request to access the memory space of the TEE operating system, and the target dynamic library is stored in the memory space of the TEE operating system; and an allowed-information sending unit configured to send access-allowed information to the target TA based on that the target TA has permission to access the memory space of the TEE operating system, where the access-allowed information is used to notify the target TA to access the memory space of the TEE operating system.

In a possible implementation, the access request is used to request to access the target dynamic library; and the allowed-information sending unit is configured to send response information to the target TA based on that the target TA has permission to access the memory space of the TEE operating system and that the target TA has permission to invoke the target dynamic library.

For example, according to the solution provided in the third aspect, when division into the functional units is performed in an integrated manner, an eighth aspect of this embodiment provides a TA. The TA corresponds to the target TA in the solution of the third aspect. The TA may include: a loading module configured to load a target dynamic library to memory space of a target TA in response to a running request of a target service, where the target TA is any TA in one or more TAs, and the target service is a service provided by the target TA; and a service running module configured to run the target service by using the target dynamic library.

In a possible implementation, the target dynamic library is provided by the TEE operating system to the target TA.

In a possible implementation, the loading module is configured to: send an obtaining request to the TEE operating system, where the obtaining request is used to request the TEE operating system to obtain the target dynamic library; and load, to the memory space of the target TA, the target dynamic library obtained by the TEE operating system.

In a possible implementation, the target dynamic library is obtained by the TEE operating system from the REE operating system.

In a possible implementation, the loading module is configured to: send a first transfer request to a target client application CA, where the target CA is deployed on the REE operating system and has permission to invoke the target service, and the running request of the target service is sent by the target CA; and load, to the memory space of the target TA, the target dynamic library received by the TEE operating system, where the target dynamic library is sent to the TEE operating system by the REE operating system in response to a second transfer request, and the second transfer request is sent to the REE operating system by the target CA in response to the first transfer request.

In a possible implementation, the loading module is configured to load the target dynamic library from memory space of the TEE operating system to the memory space of the target TA.

In a possible implementation, the loading module is configured to: send an access request to the TEE operating system, where the access request is used to request to access the memory space of the TEE operating system, and the target dynamic library is stored in the memory space of the TEE operating system; and access the target dynamic library in the memory space of the TEE operating system based on received access-allowed information sent by the TEE operating system, and load the target dynamic library to the memory space of the target TA.

For example, according to the solution provided in the fourth aspect, when division into the functional units is performed in an integrated manner, a ninth aspect of the embodiments of this application provides an REE operating system. The REE operating system may include: a file obtaining module configured to obtain a target file in response to a transfer request, where the transfer request is used to indicate the REE operating system to transfer the target file to the TEE operating system; and an REE communications module configured to send the target file to the TEE operating system.

In a possible implementation, the target file is a target dynamic library, the target dynamic library is used to be loaded to memory space of a target TA, to support the target TA in running a target service, the target service is a service provided by the target TA, and the target TA is any TA in one or more TAs deployed on the TEE operating system.

In a possible implementation, the transfer request is sent by the TEE operating system, or the transfer request is sent by a target client application CA, and the target CA has permission to invoke the target service.

For example, according to the solution provided in the fifth aspect, when division into the functional units is performed in an integrated manner, a tenth aspect of the embodiments of this application provides a TEE operating system. The TEE operating system may include: a memory applying module configured to send a first memory request to an REE operating system, where the first memory request is used to request the REE operating system to allocate memory to the TEE operating system; a memory receiving module configured to receive memory allocation information sent by the REE operating system, where the memory allocation information is used to indicate that the memory allocated to the TEE operating system is target memory; and a memory configuration module configured to configure the target memory as secure memory.

In a possible implementation, the memory applying module is further configured to: before sending the first memory request to the REE operating system, obtain a second memory request sent by a target TA, where the target TA is any TA in one or more TAs deployed on the TEE operating system, and the second memory request is used to apply to the TEE operating system for memory.

In a possible implementation, the memory configuration module is further configured to: after configuring the target memory as the secure memory, allocate the target memory to the target TA.

In a possible implementation, the second memory request is sent by the target TA in response to a running request of a target service, the second memory request is used to apply for memory required by the target TA for running the target service, and the target service is a service provided by the target TA.

In a possible implementation, the memory applied for by the first memory request is greater than the memory applied for by the second memory.

In a possible implementation, the memory applying module is further configured to: after the memory configuration module allocates the first memory to the target TA, receive a TA memory release request sent by the target TA, where the TA memory release request is used to request the TEE operating system to release the target memory; and release the target memory in response to the TA memory release request.

In a possible implementation, the memory configuration module is further configured to: after the memory configuration module releases the target memory, configure the target memory as non-secure memory; and the memory applying module is further configured to send a TEE memory release request to the REE operating system, where the TEE memory release request is used to request the REE operating system to release the target memory.

An eleventh aspect of the embodiments of this application provides a computer device, including a processor and a memory. When running computer instructions stored in the memory, the processor performs the first aspect or any possible implementation of the first aspect of the embodiments of this application, performs the second aspect or any possible implementation of the second aspect of the embodiments of this application, performs the third aspect or any possible implementation of the third aspect of the embodiments of this application, performs the fourth aspect or any possible implementation of the fourth aspect of the embodiments of this application, or performs the fifth aspect or any possible implementation of the fifth aspect of the embodiments of this application.

A twelfth aspect of the embodiments of this application provides a computer-readable storage medium, including instructions. When the instructions are run on a computer, the computer is enabled to perform the first aspect or any possible implementation of the first aspect of the embodiments of this application, perform the second aspect or any possible implementation of the second aspect of the embodiments of this application, perform the third aspect or any possible implementation of the third aspect of the embodiments of this application, perform the fourth aspect or any possible implementation of the fourth aspect of the embodiments of this application, or perform the fifth aspect or any possible implementation of the fifth aspect of the embodiments of this application.

A thirteenth aspect of the embodiments of this application provides a computer program product (which is also referred to as a computer program), including instructions. When the instructions are run on a computer, the computer is enabled to perform the first aspect or any possible implementation of the first aspect of the embodiments of this application, perform the second aspect or any possible implementation of the second aspect of the embodiments of this application, perform the third aspect or any possible implementation of the third aspect of the embodiments of this application, perform the fourth aspect or any possible implementation of the fourth aspect of the embodiments of this application, or perform the fifth aspect or any possible implementation of the fifth aspect of the embodiments of this application.

The apparatuses provided in the embodiments of this application may be configured to perform the methods in the foregoing corresponding embodiments. Therefore, for technical effects that can be obtained by the apparatus embodiments of this application, refer to the foregoing corresponding method embodiments. Details are not described herein again.

DESCRIPTION OF EMBODIMENTS

Embodiments of this application provide a trusted application running method, an information processing method, a memory allocation method, and an apparatus. The method in the embodiments of this application may be applied to a computer system. For example, the computer system may be a terminal device. Common terminal devices include, for example, a mobile phone, a tablet computer, a desktop computer, a wearable device (for example, a smart watch), a smart home device (for example, a smart speaker or a smart television), a vehicle-mounted smart device, an unmanned device, a virtual reality device, an augmented reality device, a mixed reality device, and an artificial intelligence device. The embodiments of this application are described in the following with reference to the accompanying drawings by using an example in which the computer system is a terminal device.

With development of the mobile internet, intelligent terminal devices are increasingly widely used. The terminal devices are usually built an REE that provides an open operating environment, to provide rich functions and extensible attributes of the intelligent terminal devices. The REE is also referred to as a general operating environment, and mainly includes a Rich OS that is also referred to as an REE operating system and that runs on a general-purpose processor, and a client application (CA) that runs on the REE operating system. However, the open environment provides a channel for information disclosure and malware propagation. As a result, the terminal devices are exposed to a growing number of attacks, leading to increasingly serious security problems for the terminal devices.

Figure 1:
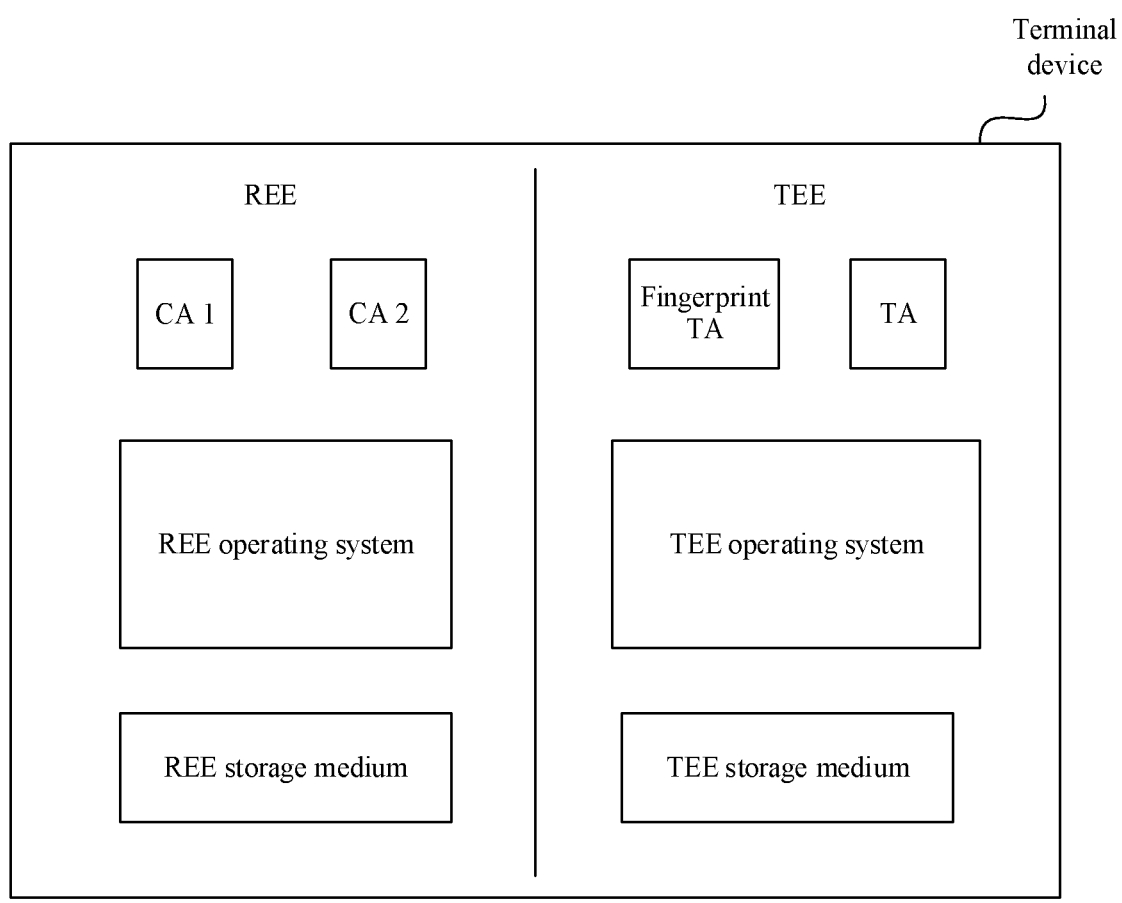
FIG. 1 is a schematic structural diagram of a terminal device.

To protect user privacy and information security, the Global Platform proposes a TEE standard. FIG. 1 is a schematic structural diagram of a terminal device. Referring to FIG. 1, the terminal device is built on an REE and a TEE. The TEE is an independent running environment that runs outside the REE, and mainly includes a Trusted OS that is also referred to as a TEE operating system, and one or more TAs running on the TEE operating system. The TEE is isolated from the REE. In a possible implementation, a monitor system may complete switching of a processor between the REE operating system and the TEE operating system. When a process in the REE runs on the processor, a process in the TEE is suspended. When a process in the TEE runs on the processor, a process in the REE is suspended. Each TA running on the TEE operating system is independent. A TA cannot access a security resource of another TA without authorization. The REE cannot directly access hardware resources and software resources of the TEE, and the REE can interact with the TEE only through an authorized application programming interface (API). It is no longer emphasized that interaction, described in this application, between a process in the TEE (for example, a process of a TA or a process of a TEE operating system) and a process in the REE (for example, a process of a CA or a process of an REE operating system) is implemented through an API, to simplify description. Therefore, the TEE can defend against software attacks that occur on an REE side. For example, a secure attribute is configured for some storage media (which is referred to as a TEE storage medium) of the terminal device is configured as accessible only by the TEE, and a secure attribute of other storage media (which is referred to as an REE storage medium) of the terminal device is configured as accessible only by the REE. The TEE storage medium includes TEE memory, and the TEE memory includes memory allocated to the TA (TA memory) and memory of a TEE operating system (TEE operating system memory). It should be noted that the TEE storage medium and the REE storage medium may be physically separate or integrated.

The CA may access the TA by invoking an API zone of the TEE, to invoke the TA to execute a security service. For example, the CA may request the TA to provide a service related to identity verification. A process in which a fingerprint TA executes a fingerprint comparison service is described in the following by using an example in which the TA is the fingerprint TA and is used to execute the fingerprint comparison service.

Figure 2A:
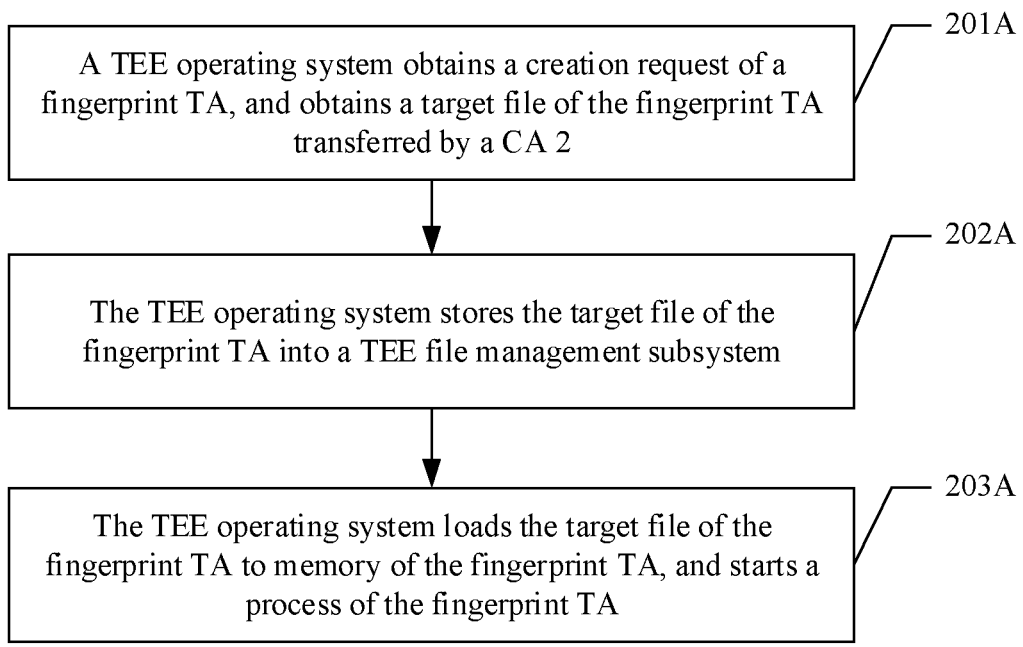
FIG. 2A is a schematic diagram of a process of starting a fingerprint TA in the conventional technology.

First, a process of starting the fingerprint TA is described. Referring to FIG. 2A, the process of starting the fingerprint TA includes the following steps.

201A: A TEE operating system obtains a creation request of a fingerprint TA, and obtains a target file of the fingerprint TA transferred by a CA 2.

It is assumed that the CA 2 needs to invoke the fingerprint TA to execute the fingerprint comparison service in a running process, but the fingerprint TA is not started. In this case, the CA 2 may obtain the target file of the fingerprint TA from a ROM of an REE, send the creation request of the fingerprint TA to the TEE operating system, and transfer the target file of the fingerprint TA to the TEE operating system.

202A: The TEE operating system stores the target file of the fingerprint TA into a TEE file management subsystem.

After receiving the target file of the fingerprint TA transferred by the CA 2, the TEE operating system may store the target file of the fingerprint TA into TEE operating system memory. For example, the target file of the fingerprint TA may be stored into the TEE file management sub system.

203A: The TEE operating system loads the target file of the fingerprint TA to memory of the fingerprint TA, and starts a process of the fingerprint TA.

The TEE operating system may allocate memory to the fingerprint TA according to the creation request of the fingerprint TA, load the target file of the fingerprint TA into the memory of the fingerprint TA, start the fingerprint TA, and execute the target file by using the process of the fingerprint TA.

Figure 2B:
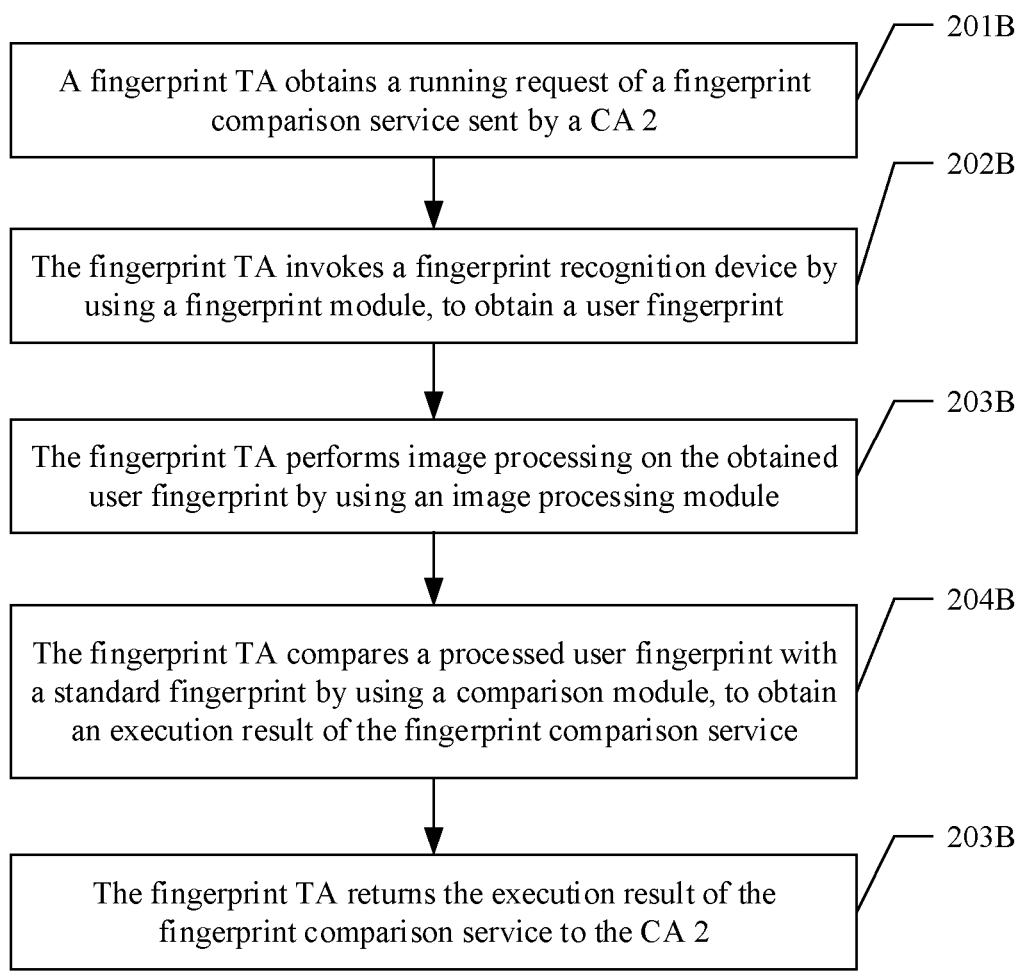
FIG. 2B is a schematic diagram of a process of performing a fingerprint comparison service by a fingerprint TA in the conventional technology.

After the TEE operating system starts the process of the fingerprint TA, the fingerprint TA may execute the fingerprint comparison service. Referring to FIG. 2B, a process in which the fingerprint TA executes the fingerprint comparison service includes the following steps.

201B: The fingerprint TA obtains a running request of the fingerprint comparison service sent by the CA 2.

After the fingerprint TA is started, the CA 2 may send a fingerprint comparison service request to the fingerprint TA, to request the fingerprint TA to obtain a user fingerprint, and compare the user fingerprint with a standard fingerprint.

Figure 2C:
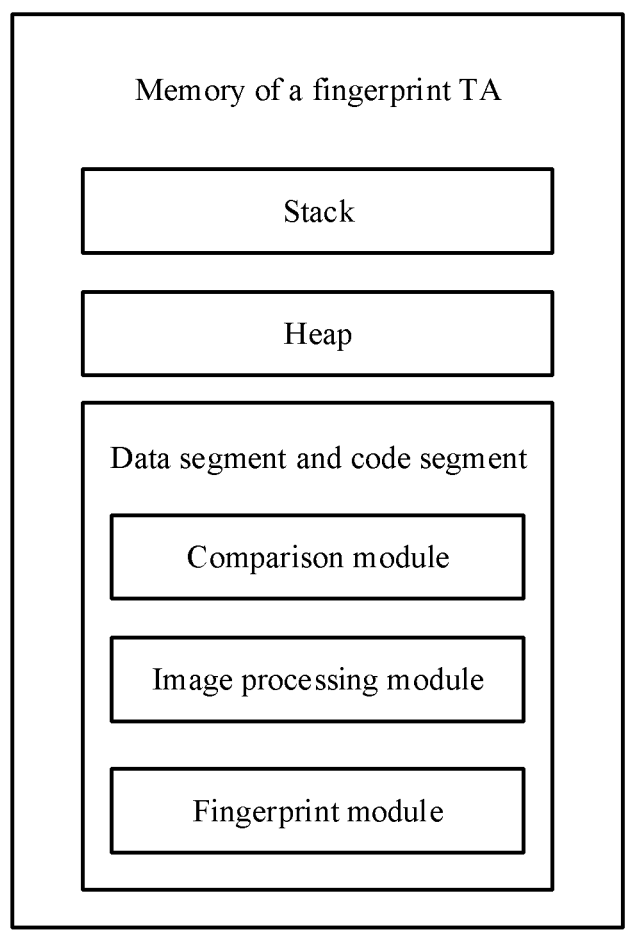
FIG. 2C is a schematic structural diagram of memory of a TA.

After obtaining the fingerprint comparison service request sent by the CA 2, the fingerprint TA may execute the fingerprint comparison service by using the target file of the fingerprint TA. Referring to FIG. 2C, memory of the TA usually includes the following segments: (1) stack is used to store a local variable temporarily created in the process of the TA; (2) heap is used to store a memory segment dynamically allocated during running of the process of the TA; (3) data segment is usually used to store a global variable that has been initialized in a program; and (4) code segment is usually used to store executable code that is in the target file of the TA.

The target file of the TA may usually be logically considered to include a running program segment used when the target TA runs a service. The TA usually needs to execute a single service by using a plurality of functions. When implementing a specific function, the TA needs to run some code of a code segment and access some data of a data segment. In this embodiment of this application, such "some data" and "some code" may be referred to as program modules corresponding to the function. Because the TA usually has a plurality of functions, it may be considered that the code segment and the data segment of the TA include a plurality of program modules, and each program module corresponds to one function.

FIG. 2C shows an example in which a code segment and a data segment of the fingerprint TA include program modules corresponding to three functions required by a fingerprint comparison service. The three program modules are a fingerprint module, an image processing module, and a comparison module. For a process in which the fingerprint TA executes the fingerprint comparison service by using the three program modules, refer to the following steps 202B to 204B.

202B: The fingerprint TA invokes a fingerprint recognition device by using the fingerprint module, to obtain the user fingerprint.

203B: The fingerprint TA performs image processing on the obtained user fingerprint by using the image processing module.

204B: The fingerprint TA compares a processed user fingerprint with the standard fingerprint by using the comparison module, to obtain an execution result of the fingerprint comparison service.

The execution result of the fingerprint comparison service is used to indicate whether the user fingerprint is consistent with the standard fingerprint.

205B: The fingerprint TA returns the execution result of the fingerprint comparison service to the CA 2.

After obtaining the execution result of the fingerprint comparison service, the CA can verify an identity of a current user and accept or reject, based on an identity verification result, a request that is of the user and that is for accessing protected content (such as an encrypted document or a payment interface).

Figure 3A:
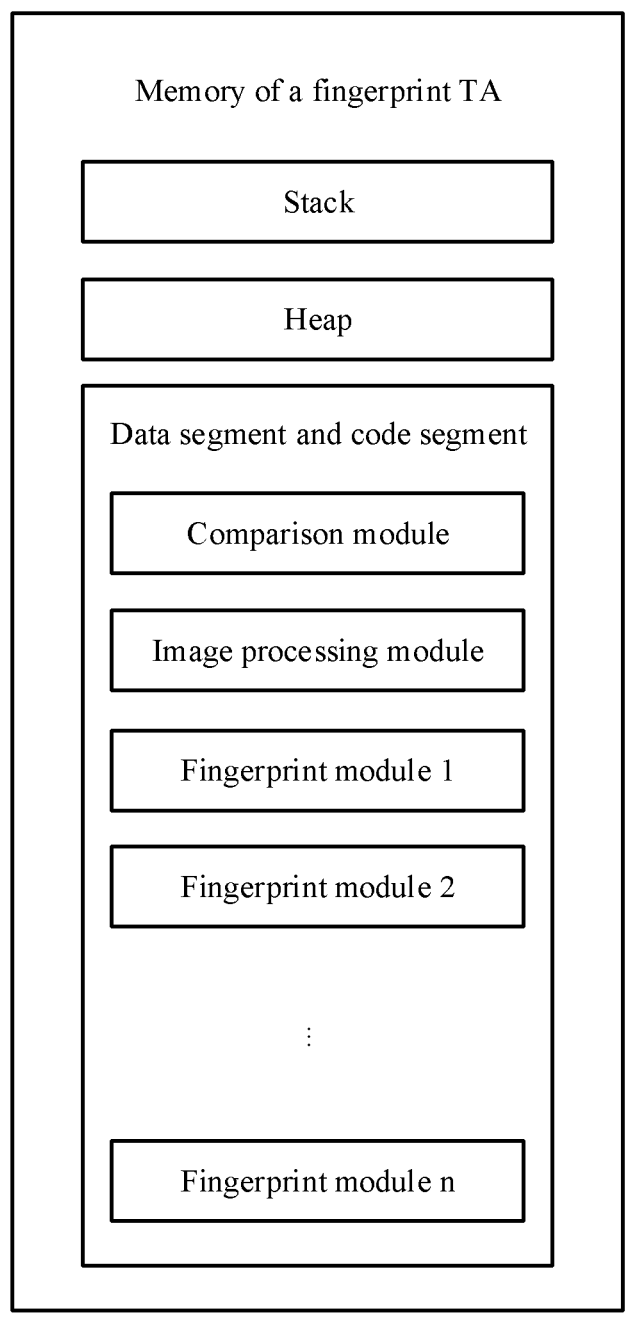
FIG. 3A is a schematic structural diagram of memory of a fingerprint TA in the conventional technology.

A function corresponding to the fingerprint module is to drive a fingerprint recognition device to detect a fingerprint of a user. Different fingerprint modules need to be compiled to drive fingerprint recognition devices of different manufacturers. Different terminal devices of a same model may use fingerprint recognition devices of different models manufactured by different manufacturers, but the terminal devices of the same model have a same mirroring requirement. Therefore, corresponding fingerprint modules need to be compiled for the fingerprint recognition devices of all the models used by the terminal devices of the model. It is assumed that there are fingerprint recognition devices of a plurality of models, and n represents a quantity of models. In this case, n fingerprint modules need to be added to a target file of the fingerprint TA. It is assumed that the n fingerprint modules are a fingerprint module 1, a fingerprint module 2, . . . , and a fingerprint module n. When a TEE operating system is started, a model of a fingerprint recognition device may be determined, to determine a fingerprint module corresponding to the fingerprint recognition device of this model. However, because all the fingerprint modules are compiled into the target file of the fingerprint TA, when the fingerprint TA is created, all the fingerprint modules still need to be loaded to the memory of the TA. FIG. 3A shows a structure of the memory of the fingerprint TA. A larger quantity of shipped terminal devices of this model indicates a larger value of n, a larger target file of the fingerprint TA, and larger TEE memory occupied by the fingerprint TA, causing a waste of the TEE memory.

Figure 3B:
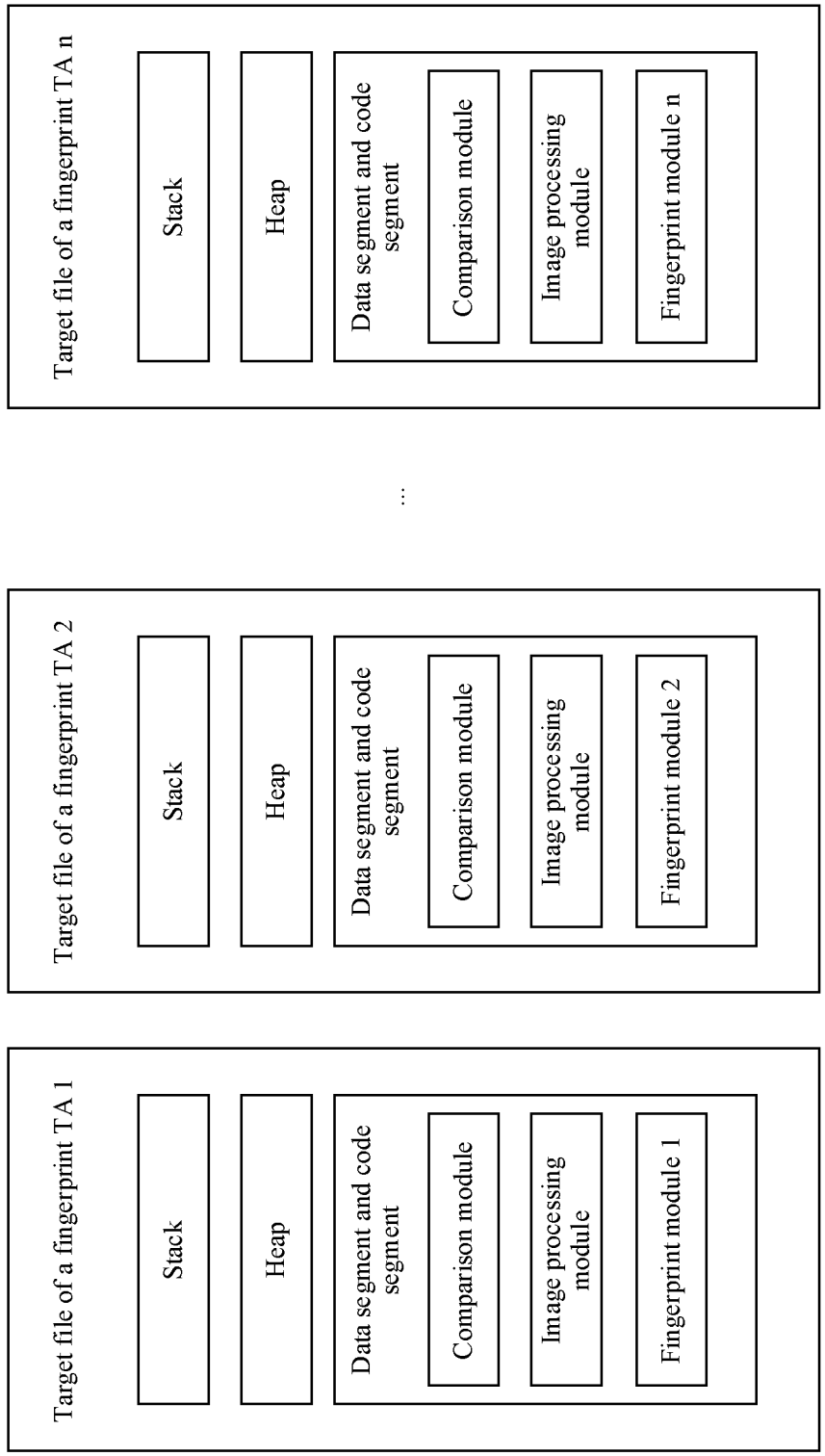
FIG. 3B is a schematic structural diagram of memory of a storage medium of an REE in the conventional technology.

Compiling target files of a plurality of fingerprint TAs is proposed in the conventional technology, and a fingerprint module corresponding to a fingerprint recognition device of one model is added to a target file of each fingerprint TA, to save TEE memory. Assuming that there are fingerprint recognition devices of n models, target files of n fingerprint TAs need to be compiled, and compiled target files of the n fingerprint TAs are stored into an REE storage medium. FIG. 3B a schematic diagram of target files of n fingerprint TAs (a fingerprint TA 1, a fingerprint TA 2, . . . , and a fingerprint Ta n) in the REE storage medium. When the TEE operating system is started, a model of a fingerprint recognition device may be determined, to determine a fingerprint TA corresponding to the fingerprint recognition device of this model. The compiled target files of the n fingerprint TAs are stored into a storage device of an REE, for example, may be stored into a read-only memory (ROM) in the REE. A large amount of overlapping program content exists between different fingerprint TAs, for example, content in stacks and heaps, and common program modules in code segments and data segments, for example, the image processing module and the comparison module in the embodiment corresponding to FIG. 2B. Therefore, a large quantity of REE storage resources are wasted.

Figure 3C:
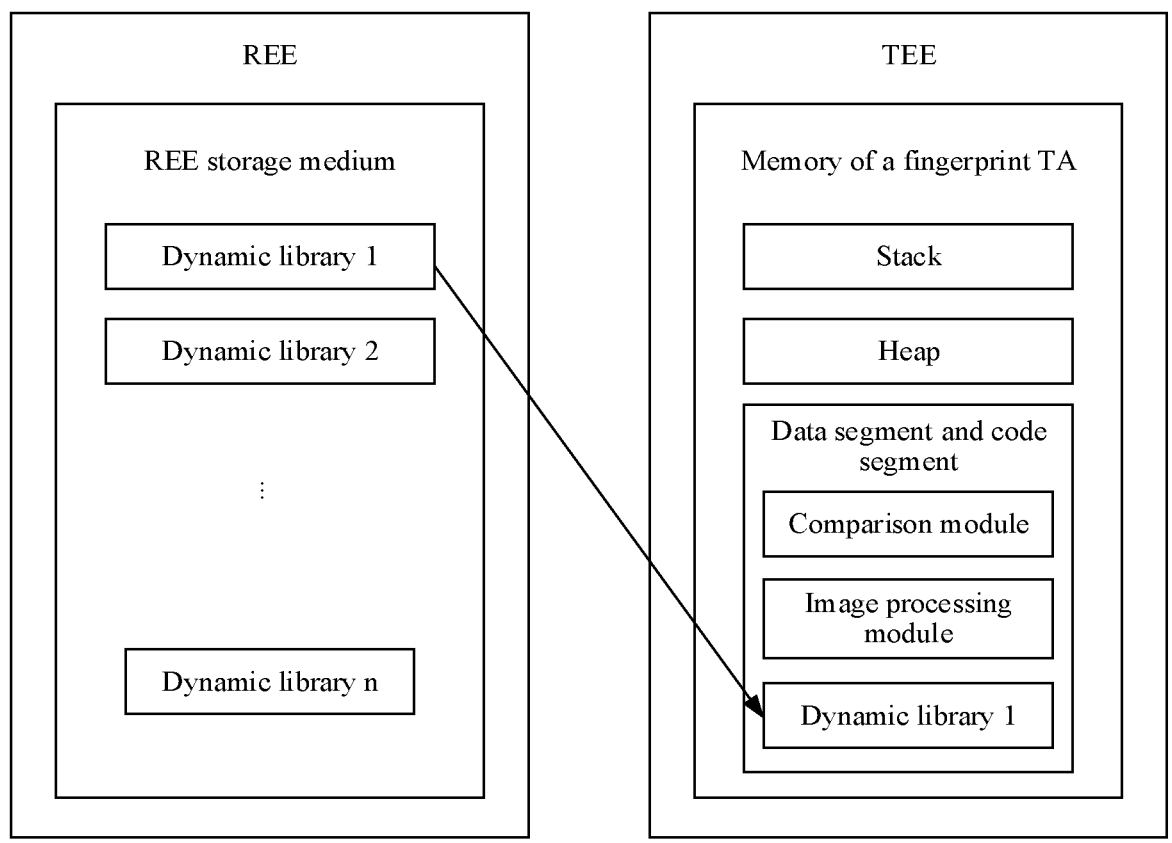
FIG. 3C is a schematic diagram of loading a dynamic library 1 by a fingerprint TA according to an embodiment of this application.

To save TEE storage resources and REE storage resources, this application proposes compiling a fingerprint module 1 to a fingerprint module n as separate dynamic libraries still by using an application scenario of the foregoing fingerprint comparison service as an example. For example, a GNU compiler collection (GCC) is used to compile the fingerprint module 1 to the fingerprint module n as a dynamic library 1 to a dynamic library n respectively. During compilation, an option "-fPIC" may be enabled, and "-share" is used during linking. Related information of each dynamic library (for example, an identifier or a symbol of a function in the dynamic library) is embedded into a target file of a fingerprint TA. To improve file security, optionally, the dynamic library 1, the dynamic library 2, . . . , the dynamic library n, and the target file of the fingerprint TA may be separately encrypted, or encrypted and signed, to obtain an encrypted file of the dynamic library 1, an encrypted file of the dynamic library 2, . . . , an encrypted file of the dynamic library n, and an encrypted file of the fingerprint TA; and each encrypted file is stored into a storage device of the REE. An information signature is used to verify information, and encrypt and sign the information. For example, the information may be first encrypted, and then an encrypted-information signature is generated; or an information signature is first generated, and then information and the information signature are encrypted. In this embodiment provided in this application, for example, a dynamic library that needs to be invoked by a TA is encrypted and signed, and then is stored into a storage device of the REE. In an actual application, the dynamic library stored in the REE may alternatively be unencrypted and unsigned, or only encrypted but unsigned. FIG. 3C is a schematic diagram of loading the dynamic library 1 by the fingerprint TA. FIG. 3C is used only to briefly show a process in which the fingerprint TA loads the dynamic library 1. Other parts (for example, the REE operating system and the TEE operating system) in the REE and the TEE that are omitted in FIG. 3C may be understood with reference to FIG. 1. Compared with compiling one fingerprint TA for each fingerprint module, this application helps reduce overlapping program content, and saves REE storage resources. Continue to refer to FIG. 3C. The REE may transfer, to the TEE, an encrypted file of a dynamic library (assumed to be the dynamic library 1) corresponding to a model of a used fingerprint recognition device. After decrypting and verifying the encrypted file, the TEE operating system loads the obtained dynamic library 1 to the memory of the fingerprint TA, such that the fingerprint TA executes a fingerprint comparison service.

The following describes a TA running method provided in this application. The target TA mentioned in the following method embodiments may be, but is not limited to, the foregoing fingerprint TA.

Figure 4:
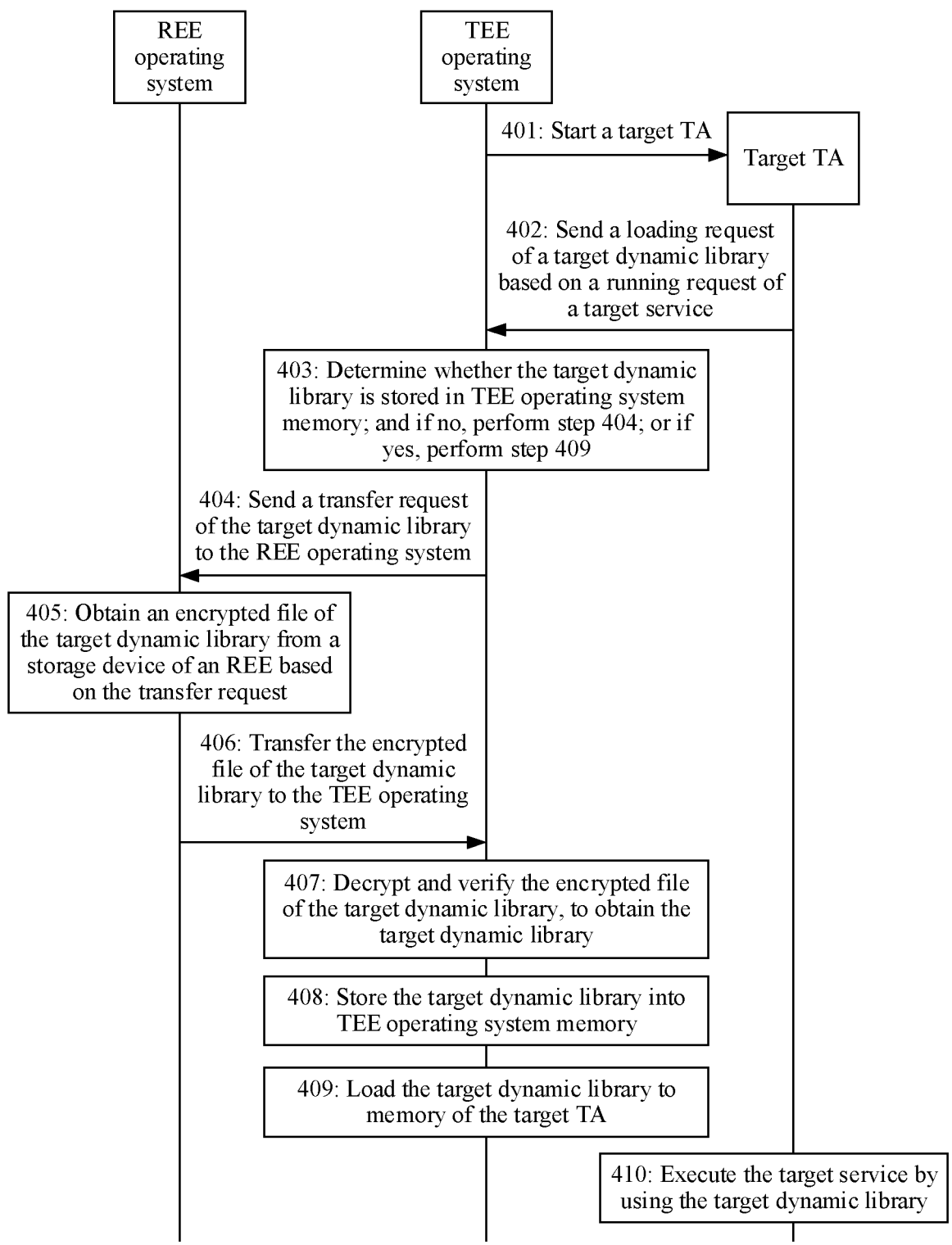
FIG. 4 is a schematic diagram of an embodiment of a TA running method according to this application.

FIG. 4 is a schematic diagram of an embodiment of a TA running method according to this application. Referring to FIG. 4, an embodiment of the TA running method according to this application may include the following steps.

401: A TEE operating system starts a target TA.

The TEE operating system may obtain an encrypted file of the target TA transferred by an REE operating system, decrypt and verify the encrypted file of the target TA to obtain a target file of the target TA, and load the target file of the target TA to memory allocated to the target TA in a process of starting the target TA. A process for creating the target TA executes a code segment that is in the target file.

For example, when a CA needs to invoke a function of the target TA, the CA may request, through an interface provided by an SDK, the TEE operating system to create the target TA. Then, the CA requests, through an open session interface provided by libteec, the TEE operating system to run the target TA in a TEE.

402: The target TA sends a loading request of a target dynamic library to the TEE operating system based on a running request of a target service obtained by the target TA.

After a process of the target TA is started, the process may be invoked by another TA in the TEE or another CA in an REE to execute the target service. It is assumed that the target TA needs to execute the target service by using a target function. In this case, in this embodiment of this application, a code segment, a data segment, and the like that correspond to the target function may be encapsulated into a target dynamic library, and related information of the target dynamic library (for example, a reference to a symbol, a symbol table, and relocation information) is embedded into the target file of the target TA, and the target TA may invoke the target dynamic library when executing the target service.

In this embodiment of this application, the encrypted file of the target dynamic library may be stored into a storage device of an REE. When the target TA needs to invoke the target dynamic library, the target TA may send, to the TEE operating system, a loading request of the target dynamic library. The loading request may include an identifier of the target dynamic library, or may include an identifier of the target TA. For example, the target TA may invoke a dlopen interface to request the TEE operating system to load the target dynamic library.

403: The TEE operating system determines whether the target dynamic library is stored in TEE operating system memory; and if no, performs step 404; or if yes, performs step 409.

After the TEE operating system receives the loading request sent by the target TA, the TEE operating system memory may be searched for the target dynamic library by using the identifier of the target dynamic library or by using the identifier of the target dynamic library and the identifier of the target TA. If the target dynamic library is not stored in the TEE operating system memory, step 404 may be performed. If the target dynamic library is stored in the TEE operating system memory, step 409 may be performed.

404: The TEE operating system sends a transfer request of the target dynamic library to the REE operating system.

Based on that the target dynamic library is not stored in the TEE operating system memory, the TEE operating system may send the transfer request of the target dynamic library to the REE operating system. It is assumed that an agent process in the REE operating system is configured to transfer an encrypted file of the dynamic library to the TEE operating system. In this case, the TEE operating system may wake up the agent process, and send the transfer request to the agent process. The transfer request may include the identifier of the target dynamic library, or include the identifier of the target dynamic library and the identifier of the target TA.

405: The REE operating system obtains the encrypted file of the target dynamic library from the storage device of the REE based on the transfer request.

Encrypted files of all dynamic libraries are stored in the storage device of the REE. For example, assuming that the encrypted files are stored in a vendor/bin directory, the agent process may search the vendor/bin directory for the encrypted file of the target dynamic library based on the identifier of the target dynamic library or the identifier of the target dynamic library and the identifier of the target TA. For example, a file name of the encrypted file of the target dynamic library may be uuid1-fingerdriver1.so.sec, to uniquely identify the target dynamic library that needs to be invoked by the target TA. The REE operating system may search the vendor/bin directory for the encrypted file of the target dynamic library based on the identifier "uuid1" of the target TA and the identifier "fingerdriver1" of the target dynamic library in the received transfer request.

406: The REE operating system transfers the encrypted file of the target dynamic library to the TEE operating system.

For example, after finding the encrypted file of the target dynamic library, the agent process of the REE may transfer the encrypted file of the target dynamic library to the TEE operating system.

407: The TEE operating system decrypts and verifies the encrypted file of the target dynamic library to obtain the target dynamic library.

The TEE operating system may decrypt the encrypted file of the target dynamic library to obtain the target dynamic library, and perform signature verification on the target dynamic library. If verification succeeds, it indicates that the target dynamic library is not modified, and step 408 may continue to be performed. If verification fails, it indicates that the target dynamic library may be modified, and another operation may be performed, for example, step 404 is performed again.

408: The TEE operating system stores the target dynamic library into the TEE operating system memory.

After obtaining the target dynamic library, the TEE operating system may store the target dynamic library into the TEE operating system memory (for example, a file system).

409: The TEE operating system loads the target dynamic library to memory of the target TA.

In an existing dynamic link technology, permission to access system memory and permission to configure a memory attribute of an application are usually configured for the application, such that the application can load, to memory space of the application, a dynamic library that needs to be invoked, and configure a corresponding attribute for the dynamic library. A specific security risk exists when the permission to access the system memory and the permission to configure the memory attribute of the application are configured for the application. To improve security of the TEE, in this embodiment of this application, permission to access the TEE operating system memory and permission to configure a memory attribute of the TA may not be configured for the TA, and the TEE operating system loads the target dynamic library to the memory of the target TA. Usually, the loading process may include: The TEE operating system maps or loads the target dynamic library to memory space of the target TA, performs symbol parsing and relocation, and configures a corresponding attribute for memory corresponding to the target dynamic library. For example, an executable attribute is configured for a memory corresponding to a code segment in the target dynamic library, and a read-only attribute is configured for a memory corresponding to a data segment in the target dynamic library.

410: The target TA executes the target service by using the target dynamic library.

Based on that the target dynamic library is loaded to the memory space of the target TA, the target TA may execute the target service by using a function of the target dynamic library. It should be noted that, that the target TA may execute the target service by using the function of the target dynamic library does not limit that the target TA may execute the target service by using only the target dynamic library, but limits that the target TA needs to execute the target service by using at least the target dynamic library. In an actual application, in addition to using the target dynamic library, the target TA may further execute the target service by using content in the target file of the target TA or another dynamic library. For example, the target TA may invoke a dlsym interface to obtain code of a function in the target dynamic library. After completing the target service, the target TA may invoke a dlclose interface to terminate the invocation.

Program segments corresponding to some functions of the TA are encapsulated into a dynamic library. This improves flexibility of a TA loading policy. In the embodiment corresponding to FIG. 4, when the TA needs to invoke a dynamic library, the TEE operating system may obtain the encrypted file of the dynamic library from the REE operating system. After the encrypted file is decrypted and verified, the TEE operating system may load the dynamic library to the memory of the TA, such that the TA executes a function corresponding to the dynamic library. An application scenario of the foregoing fingerprint comparison service is used as an example, the TEE operating system may store a dynamic library corresponding to a model of a fingerprint recognition device into the TEE operating system memory, without obtaining a dynamic library corresponding to another model. This helps reduce a waste of TEE memory. In addition, in a process of running the fingerprint TA, the fingerprint comparison service may not need to be executed. In the embodiment corresponding to FIG. 4, the TEE operating system obtains the target dynamic library from the REE and loads the target dynamic library to the memory of the TA, only when receiving the request for loading the target dynamic library by the TA. This helps further save TEE memory.

The embodiment corresponding to FIG. 4 is merely used as an example. In an actual application, none or some of steps 403 to 408 may be performed based on a requirement. For example, step 409 is directly performed after step 402.

In a possible implementation, after the TEE operating system stores the target dynamic library into the TEE operating system memory, the TEE operating system may load the target dynamic library to memory of another TA when receiving a request for loading the target dynamic library by the other TA. A plurality of TAs share a same dynamic library, and this helps further save secure memory in the TEE.

Each TA running in the TEE is independent, and the TA cannot access a security resource of another TA without authorization. If a dynamic library to which the TA is dynamically linked is considered as a security resource of the TA, to improve security of the TEE, in a possible implementation, the TEE operating system may set target permission information for the target dynamic library. The target permission information is used to indicate specific TAs that have permission to invoke the target dynamic library, or indicate specific TAs that do not have permission to invoke the target dynamic library. In the method embodiment corresponding to FIG. 4, after step 408 is performed and before step 409 is performed, the following steps may be further performed.

411: The TEE operating system determines, based on the target permission information, whether the target TA has permission to invoke the target dynamic library; and if yes, performs step 409; or if no, performs step 412.

Based on that the TEE operating system obtains the request for loading the target dynamic library by the target TA, the TEE operating system may read the target permission information of the target dynamic library; determine, based on the target permission information, whether the target TA has permission to invoke the target dynamic library; and if the target TA has permission, perform step 409; or if the target TA does not have permission to, perform step 412.

In a possible implementation, the target permission information may be an identifier of a TA that has permission to invoke the target dynamic library. For ease of description, the identifier of the TA that has permission to invoke the target dynamic library is referred to as a TA identifier.

In a possible implementation, the TA identifier may be added to a file name of the target dynamic library. In this case, the TEE operating system may read the TA identifier from the file name of the target dynamic library; determine whether the identifier of the target TA is consistent with the TA identifier; and if the identifier of the target TA is consistent with the TA identifier, determine that the target TA has permission to invoke the target dynamic library; or if the identifier of the target TA is inconsistent with the TA identifier, determine that the target TA does not have permission to invoke the target dynamic library.

In this embodiment of this application, it is not limited that the target dynamic library may be invoked by only a single TA. In some application scenarios, the target dynamic library may be invoked by a plurality of TAs. In this case, the target permission information includes a plurality of TA identifiers, and each TA identifier corresponds to one TA that can invoke the target dynamic library. In this way, it may be determined that the target TA has permission to invoke the target dynamic library, as long as the identifier of the target TA is consistent with any one of the TA identifiers. If the identifier of the target TA is consistent with none of the TA identifiers in the target TA, it may be determined that the target TA does not have permission to invoke the target dynamic library.

412: The TEE operating system performs another operation.

If the target TA does not have permission to invoke the target dynamic library, the TEE operating system may reject the request for loading the target dynamic library by the target TA.

In a possible implementation, the target permission information may be encrypted and signed, to improve security of the target permission information. In this case, step 407 may include the following step.

4071: The TEE operating system decrypts and verifies the encrypted file of the target dynamic library, to obtain the target dynamic library and the target permission information.

For example, before the target dynamic library is encrypted by using an encryption tool, an identifier of a TA (TA identifier) that can invoke the target dynamic library may be configured in a "gpd.ta.service_name" field in configuration information (manifest) of the encryption tool. For example, the TA identifier may be uuid2, and "gpd.ta.is-lib:" is set to be "true", to indicate that the target dynamic library can be invoked only by a TA corresponding to the identifier. When decrypting the encrypted file of the target dynamic library, the TEE operating system may obtain configuration information, extract a TA identifier from the configuration information, and determine that the target dynamic library can be run only by a TA corresponding to the TA identifier.

Step 408 may include the following step.

4081: The TEE operating system associates and stores the target dynamic library and the target permission information into the TEE operating system memory.

After the TEE operating system obtains the target dynamic library and the target permission information, the target dynamic library and the target permission information may be associated and stored into the TEE operating system memory (for example, a file system), to facilitate determining of the target permission information of the target dynamic library. For example, the TEE operating system may add the target permission information to the file name of the target dynamic library. For example, the target permission information is uuid2. The file name of the target dynamic library stored in the TEE operating system memory may be "uuid2-fingerdriver1.so". The TEE operating system may determine, based on the file name of the target dynamic library, the target permission information corresponding to the target dynamic library.

Figure 5:
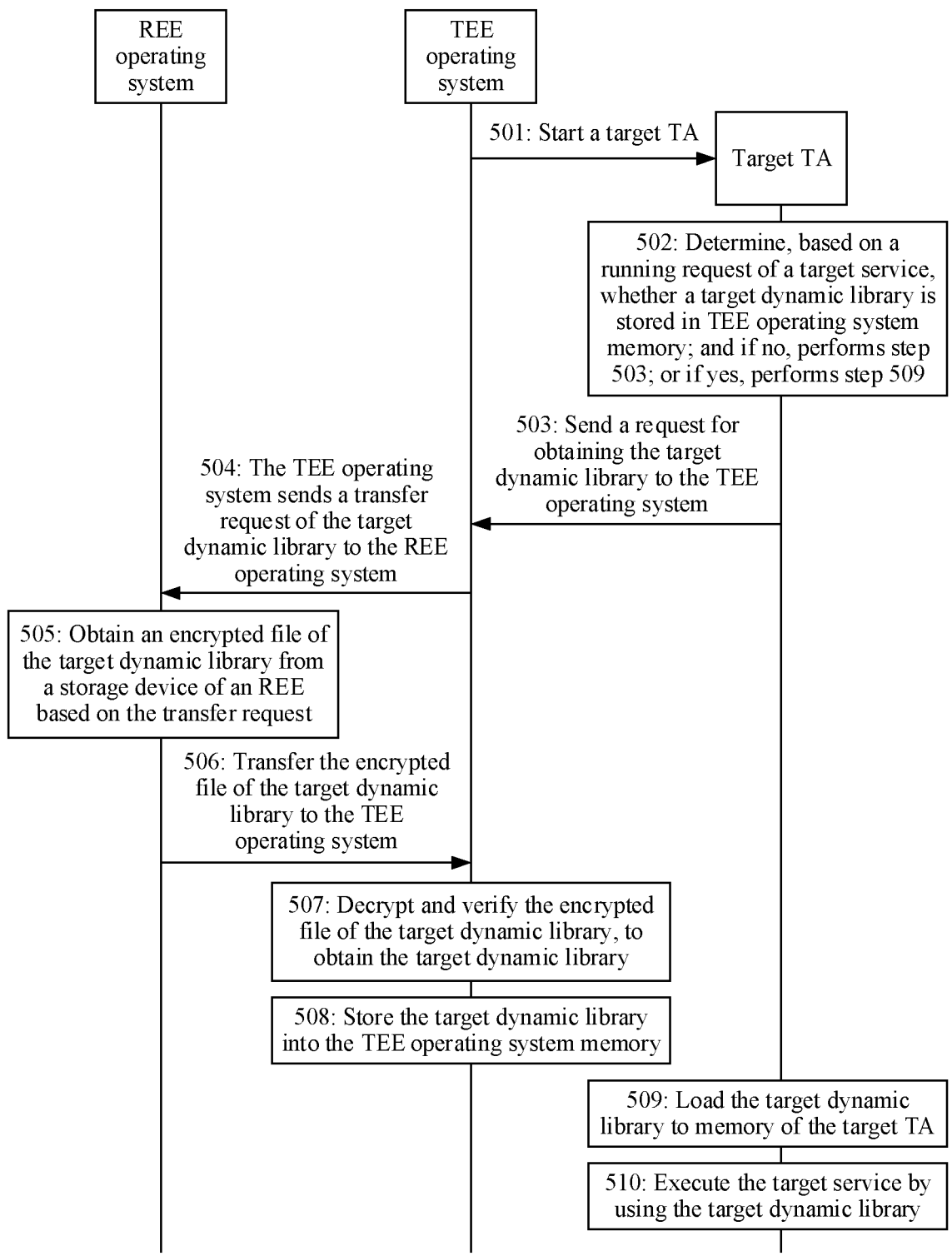
FIG. 5 is a schematic diagram of another embodiment of a TA running method according to this application.

In the embodiment corresponding to FIG. 4, permission to access the TEE operating system memory and permission to configure a memory attribute of the TA are not set for the TA, and the TEE operating system loads the target dynamic library to the memory of the target TA, to improve security of the TEE. In another embodiment of a TA running method in this application, permission to access TEE operating system memory and permission to configure a memory attribute of a TA may alternatively be set for the TA. Referring to FIG. 5, another embodiment of a TA running method in this application may include the following steps.

501: A TEE operating system starts a process of a target TA.

Step 501 may be understood with reference to the description of step 401, and details are not described herein again.

502: The target TA determines, based on an obtained running request of a target service, whether a target dynamic library is stored in TEE operating system memory; and if no, performs step 503; or if yes, performs step 509.

It is assumed that the target TA needs to execute the target service by using a function of the target dynamic library. In this case, the target TA may search the TEE operating system memory for the target dynamic library by using an identifier of the target dynamic library or by using an identifier of the target dynamic library and an identifier of the target TA and based on the running request of the target service obtained by the target TA. If the target dynamic library is not stored in the TEE operating system memory, step 503 may be performed; or if the target dynamic library is stored in the TEE operating system memory, step 509 may be performed.

503: The target TA sends a request for obtaining the target dynamic library to the TEE operating system.

Based on that the target dynamic library is not stored in the TEE operating system memory, the target TA may send the request for obtaining the target dynamic library to the TEE operating system, where the obtaining request may include the identifier of the target dynamic library, and may also include the identifier of the target TA. For example, the target TA may invoke a dlopen interface to request the TEE operating system to obtain the target dynamic library, and store the target dynamic library into the TEE operating system memory.

504: The TEE operating system sends a transfer request of the target dynamic library to the REE operating system.

505: The REE operating system obtains an encrypted file of the target dynamic library from a storage device of an REE based on the transfer request.

506: The REE operating system transfers the encrypted file of the target dynamic library to the TEE operating system.

507: The TEE operating system decrypts and verifies the encrypted file of the target dynamic library to obtain the target dynamic library.

508: The TEE operating system stores the target dynamic library into the TEE operating system memory.

For steps 504 to 508, refer to the description of steps 404 to 408. Details are not described herein again.

509: The target TA loads the target dynamic library to memory of the target TA.

After storing the target dynamic library into the TEE operating system memory, the TEE operating system may notify that the target TA has obtained the target dynamic library, and the target TA may load the target dynamic library into the memory of the target TA. Usually, the loading process may include: The target TA maps or loads the target dynamic library to memory space of the target TA, parses and relocates a symbol in the target dynamic library, and configures a corresponding attribute for memory corresponding to the target dynamic library. For example, an executable attribute is configured for memory corresponding to a code segment in the target dynamic library, and a read-only attribute is configured for memory corresponding to a data segment in the target dynamic library.

510: The target TA executes the target service by using the target dynamic library.

For example, the target TA may invoke a dlsym interface to obtain code of a function in the target dynamic library, and then the target TA may invoke a dlclose interface to terminate the invocation.

The embodiment corresponding to FIG. 5 is merely used as an example. In an actual application, none or some of steps 502 to 508 may not be performed based on a requirement. For example, step 509 is directly performed after the target TA obtains the running request of the target service.

To improve security of the TEE, in a possible implementation, the TEE operating system may set target permission information for the target dynamic library. The target permission information is used to indicate specific TAs that have permission to invoke the target dynamic library, or indicate specific TAs that do not have permission to invoke the target dynamic library. Before step 510, the method embodiment corresponding to FIG. 5 may further include the following steps.

511: The target TA sends, to the TEE operating system, a request for accessing the target dynamic library in the TEE operating system memory.

Based on that the TEE operating system stores the target dynamic library into the TEE operating system memory, the target TA may send, to the TEE operating system, the request for accessing the target dynamic library in the TEE operating system memory, where the access request may include the identifier of the target dynamic library.

512: The TEE operating system determines, based on the target permission information, whether the target TA has permission to invoke the target dynamic library; and if yes, performs step 513; or if no, performs step 514.

For a method for determining, by the TEE operating system based on the target permission information, whether the target TA has permission to invoke the target dynamic library, refer to related description in step 409. Details are not described herein again.

513: The TEE operating system sends access-allowed information of the target dynamic library to the target TA.

Based on that the target TA obtains the access-allowed information of the target dynamic library sent by the TEE operating system, the target TA may perform step 509.

514: The TEE operating system sends an access-rejected notification of the target dynamic library to the target TA.

Based on that the target TA obtains the access-rejected notification of the target dynamic library sent by the TEE operating system, the target TA cannot load the target dynamic library. This helps prevent a TA that does not have permission to invoke the target dynamic library from loading the target dynamic library, and prevents the target dynamic library from being disclosed.

In some embodiments, after receiving the access request of the target TA, the TEE operating system may further determine whether the target TA has permission to access the TEE operating system memory. The TEE operating system sends the access-allowed information of the target dynamic library to the target TA based on that the target TA has permission to access the TEE operating system memory and that the target TA has permission to invoke the target dynamic library.

In the foregoing TA running method in this application, the target dynamic library is loaded to the memory of the target TA after the target TA is started. In a possible implementation, the TEE operating system may load the target dynamic library to the memory of the target TA in an initialization process of the target TA. For example, in the initialization process of the target TA, the TEE operating system may obtain, based on identifiers of dynamic libraries recorded in the target file of the target TA, all or some of the dynamic libraries (which include or do not include the target dynamic library) recorded in the target file of the target TA. For example, refer to steps 404 to 408. The TEE operating system stores, into the TEE operating system memory, all or some dynamic libraries invoked by the target TA. Then, the TEE operating system may directly load each of the dynamic libraries to the memory of the target TA. Alternatively, based on that the loading request of the target service sent by the target TA is obtained, the TEE operating system loads the target dynamic library from the TEE operating system memory to the memory of the target TA if the target dynamic library has already been stored in the TEE operating system memory.

Before the target TA obtains the running request of the target service, the target dynamic library may have been stored in the TEE operating system memory, or even have been loaded to the memory of the target TA. This helps improve completion efficiency of the target service.

However, the TA usually invokes a corresponding dynamic library based on a service that needs to be executed. To be more specific, the target TA may not need to invoke, during running, some dynamic libraries recorded in the target file of the target TA. However, in the initialization process of the target TA, the TEE operating system loads, to the memory of the target TA, all dynamic libraries that may be invoked by the target TA. This is prone to cause a waste of secure memory in the TEE. To balance memory resources and loading efficiency, the TEE operating system may predict, from each of the dynamic libraries recorded in the target file, one or more dynamic libraries with a higher probability of being invoked, and obtain a corresponding predicted dynamic library in a process of starting the target TA.

In the foregoing TA running method in this application, the REE operating system performs steps 405 and 406 based on that the transfer request of the target dynamic library sent by the TEE operating system is obtained. In a possible implementation, even if the REE operating system does not obtain the transfer request of the target dynamic library sent by the TEE operating system, the REE operating system may actively perform steps 405 and 406, to transfer the encrypted file of the target dynamic library to the TEE operating system. This helps reduce interaction between the REE and the TEE, and save computing resources of a terminal device.

Figure 6:
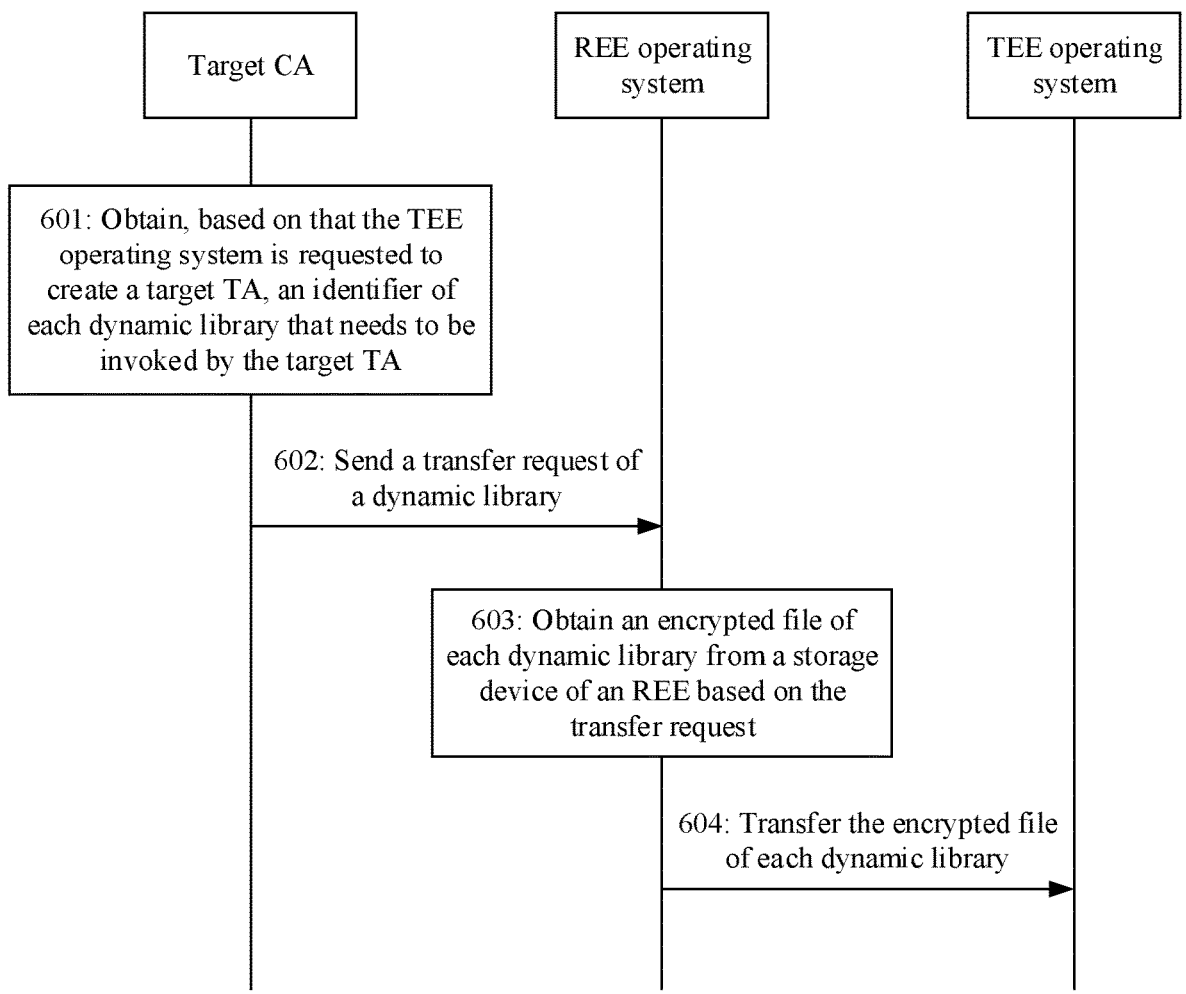
FIG. 6 is a schematic diagram of an embodiment of a method for transferring a dynamic library from an REE operating system to a TEE operating system according to this application.

In a possible implementation, referring to FIG. 6, an embodiment in which an REE operating system transfers a dynamic library to a TEE operating system may include the following steps.

601: A target CA obtains, based on that the target CA requests the TEE operating system to create a target TA, an identifier of each dynamic library that needs to be invoked by the target TA.

Running information of a TA that may be invoked by the target CA may be recorded in a target file of the target CA. For example, the identifier of each dynamic library that needs to be invoked by the target TA and an identifier of the target TA may be associated and recorded in the target file of the target CA. When the target CA needs to invoke the target TA to execute a service, the identifier of each dynamic library that needs to be invoked by the target TA may be searched for.

602: The target CA sends a transfer request of a dynamic library to the REE operating system, where the transfer request includes the obtained identifier of each dynamic library.

603: The REE operating system obtains an encrypted file of each dynamic library from a storage device of an REE based on the transfer request.

604: The REE operating system transfers the encrypted file of each dynamic library to the TEE operating system.

After obtaining the encrypted file of each dynamic library transferred by the TEE operating system, the TEE operating system may decrypt and verify the encrypted file of each dynamic library, and store each obtained dynamic library into TEE operating system memory. Then, in an initialization process of the target TA, the TEE operating system may load each dynamic library to memory of the target TA, or load a target dynamic library in the dynamic libraries to memory of the target TA when obtaining the loading request of the target dynamic library sent by the target TA; or the target TA may load a target dynamic library to memory of the target TA.

Figure 7:
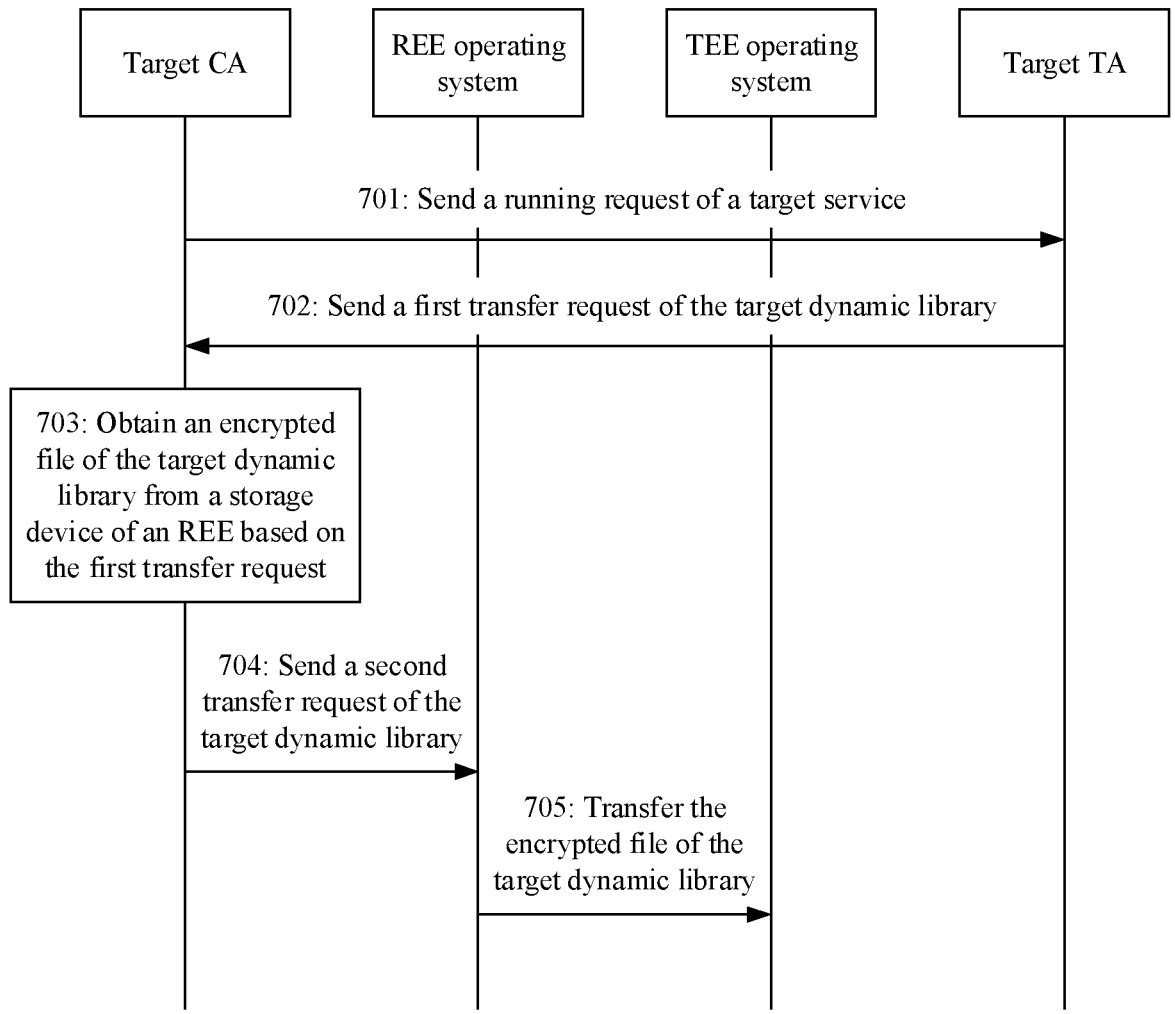
FIG. 7 is a schematic diagram of another embodiment of a method for transferring a dynamic library from an REE operating system to a TEE operating system according to this application.

In a possible implementation, referring to FIG. 7, another embodiment of a method for transferring a dynamic library by an REE operating system to a TEE operating system may include the following steps.

701: A target CA sends a running request of a target service to a target TA.

Based on that the target TA has been started, the target CA may request the target TA to execute the target service.

702: The target TA sends a first transfer request of a target dynamic library to the target TA.

Based on that the running request of the target service is obtained, the target TA may obtain an identifier of the target dynamic library that needs to be invoked when the target service is executed, and send a transfer request of the target dynamic library to the target TA. To distinguish the transfer request from another transfer request, the transfer request herein is referred to as a first transfer request. The first transfer request includes the identifier of the target dynamic library.

703: The target CA obtains an encrypted file of the target dynamic library from a storage device of an REE based on the first transfer request.

A permission to access the storage device of the REE may be configured for the target CA. In response to the first transfer request, the target CA may obtain the encrypted file of the target dynamic library from the storage device of the REE based on the first transfer request.

704: The target CA sends a second transfer request of the target dynamic library to the REE operating system.

After obtaining the encrypted file of the target dynamic library, the target CA may cache the encrypted file, and send the second transfer request of the target dynamic library to the REE operating system, to request the REE operating system to send the target dynamic library to the TEE operating system. For ease of distinguishing, the transfer request herein is referred to as a second transfer request, and the second transfer request may include the identifier of the target dynamic library.

705: The REE operating system transfers the encrypted file of the target dynamic library to the TEE operating system.

In response to the second transfer request, the REE operating system may transfer, to the TEE operating system, the encrypted file obtained by the target CA.

After obtaining the encrypted file of the target dynamic library transferred by the TEE operating system, the TEE operating system may decrypt and verify the encrypted file, and store the obtained target dynamic library into TEE operating system memory. For a process, refer to description in steps 407 and 408. Details are not described herein again. Then, the TEE operating system may directly load the target dynamic library to memory of the target TA; or when obtaining the loading request of the target dynamic library sent by the target TA, load the target dynamic library in the TEE operating system memory to the memory of the target TA. Alternatively, if permission to access the TEE operating system memory and permission to configure a memory attribute of the target TA are set for the TA, the target TA may load the target dynamic library to memory of the target TA.

In a possible implementation, a target file of the target CA may also record the identifier of the target dynamic library that needs to be invoked when the target TA executes the target service. In this case, when the target CA needs to request the target TA to execute the target service, the target CA may perform a step without sending the transfer request by the target TA.

A TEE and the REE share a memory device. A part of memory is usually allocated to the TEE according to a specific proportion. The TEE configures an attribute of the part of memory as secure memory to be used by the TEE, and configures an attribute of another part of memory as non-secure memory to be used by the REE. The REE can access only the non-secure memory, and the TEE can access only the secure memory. A task that the CA invokes the TA to execute may require a large amount of memory. For example, when executing a facial recognition task, the TA needs to calculate a large amount of graphic data to generate a large amount of intermediate data. Consequently, larger memory is required.

In the conventional technology, service logic coordination is implemented between a CA and a TA. When the TA requires large memory, the CA applies for memory and transfers the memory to the TA, and the TA applies to a TEE operating system to configure the memory as secure memory, and maps the memory to the TA for use. Before the CA exits, if the secure attribute is not actively removed, for example, the CA is exceptional and killed, an REE operating system reclaims the memory allocated to the CA and may allocate the memory to another process of the REE operating system for use. However, because an attribute of the memory is secure memory, the other process in the REE cannot access the memory, causing a stability exception.

Figure 8:
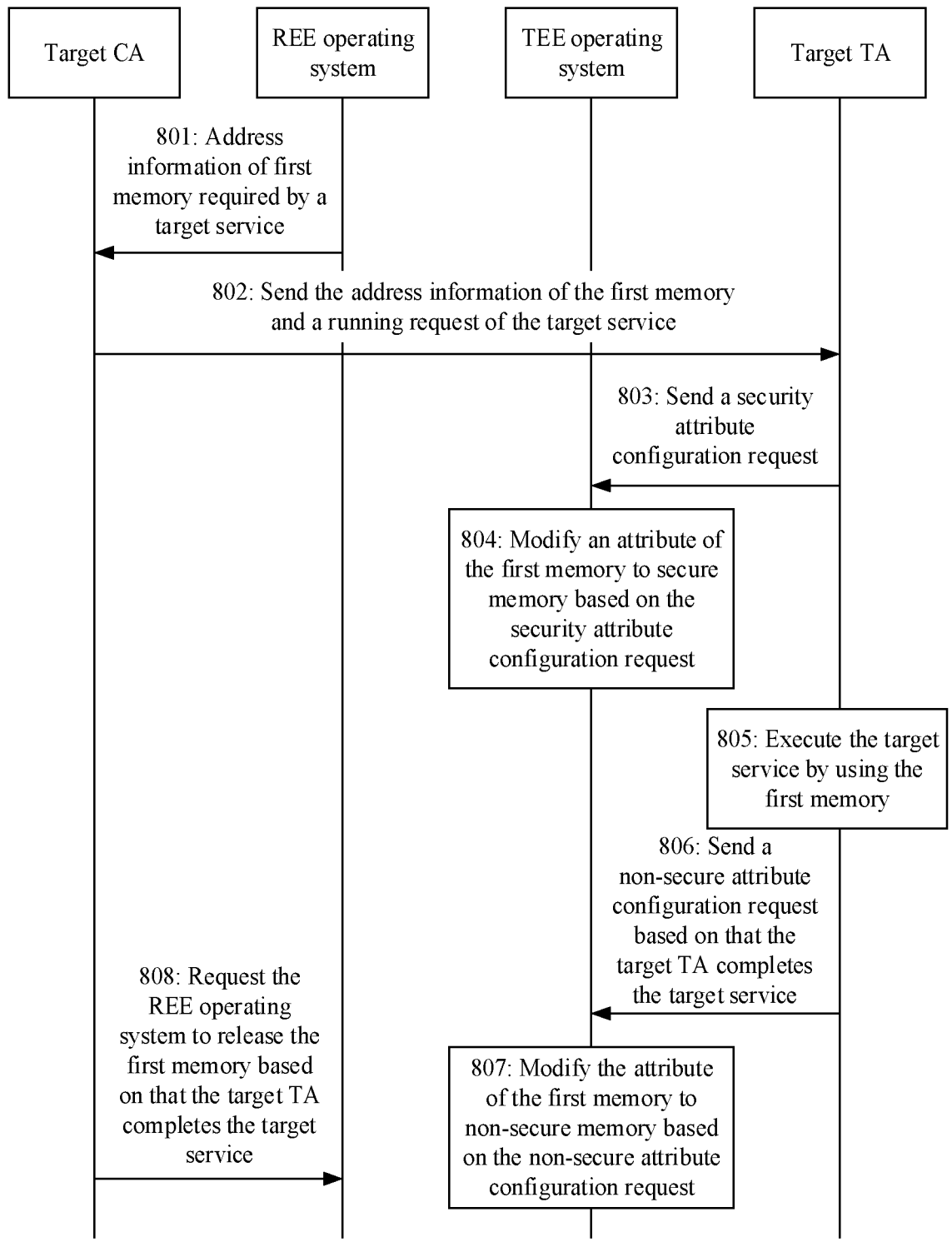
FIG. 8 is a schematic diagram of an existing memory allocation method.

Referring to FIG. 8, an existing memory allocation method is described in the following, and includes the following steps.

801: A target CA obtains address information of first memory fed back by an REE operating system in response to a memory application of the target CA.

The memory application sent by the target CA is used to apply, from the REE operating system, for memory required by the target TA to run a target service.

802: The target CA sends the address information of the first memory and a running request of the target service to the target TA.

803: The target TA sends a secure attribute configuration request to a TEE operating system, where the secure attribute configuration request includes the address information of the first memory.

804: The TEE operating system modifies an attribute of the first memory to secure memory based on the security attribute configuration request.

805: The target TA executes the target service by using the first memory.

806: The target TA sends a non-secure attribute configuration request to the TEE operating system based on that the target TA completes the target service, where the non-secure attribute configuration request includes the address information of the first memory.

807: The TEE operating system modifies the attribute of the first memory to non-secure memory based on the non-secure attribute configuration request.

808: The target CA requests, based on that the target TA completes the target service, the REE operating system to release the first memory.

An existing memory allocation method usually has the following problems:

(1) When a TA requires a large amount of memory to execute a task, a CA applies, from an REE operating system, for the memory required by the TA. When the TA completes the task, the CA notifies the REE operating system to release the corresponding memory. If the TA does not complete the task and the CA is exceptional and killed, the REE operating system releases memory allocated to the CA. CA memory release is not synchronized with TEE memory attribute modification. As a result, a problem about memory attribute configuration is caused and a terminal device resets.

(2) When a large amount of memory is required for TA running, a large quantity of interaction operations are required between the CA and the TA. Development processes of the CA and the TA are complex.

Figure 9A:
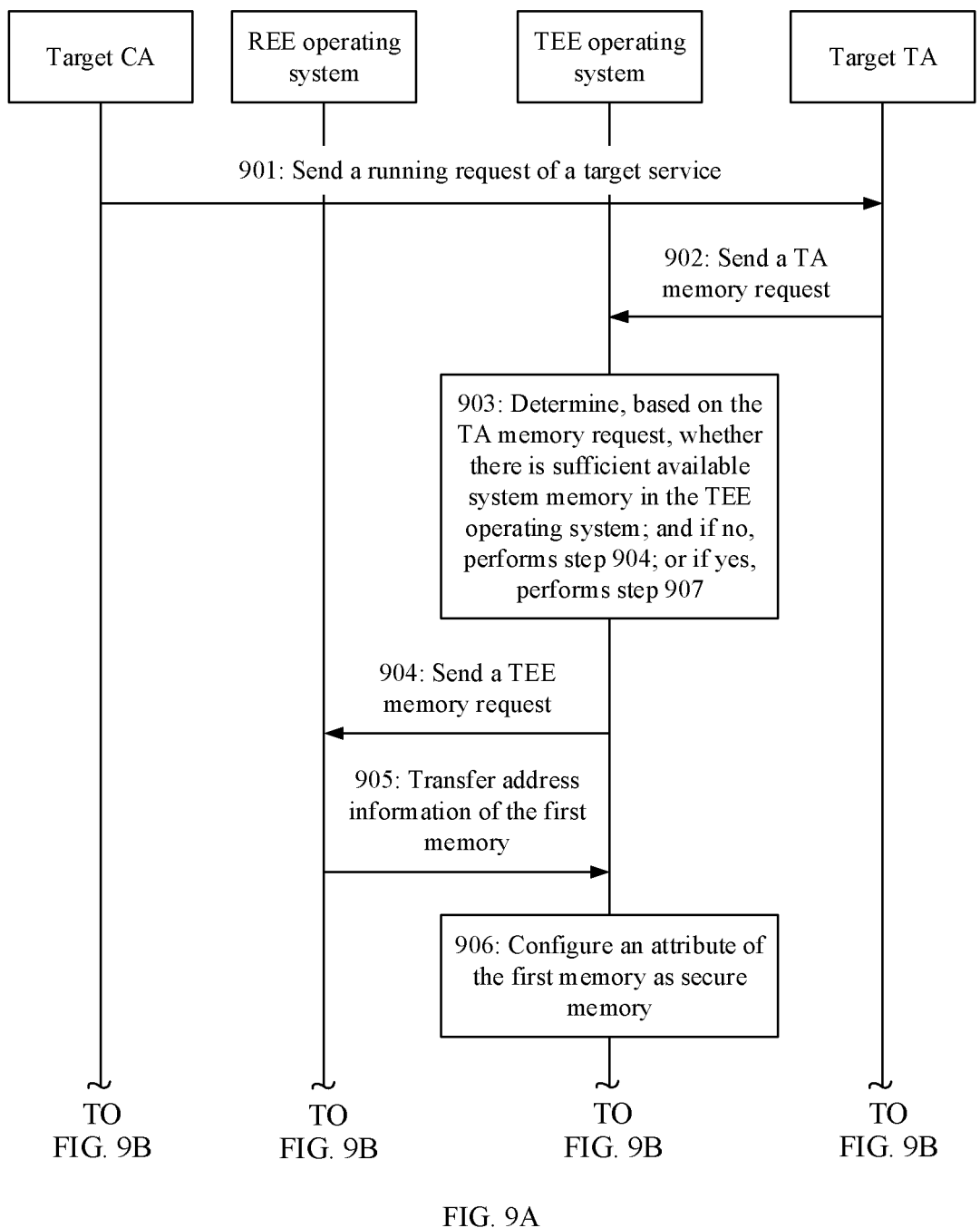
FIG. 9A and FIG. 9B are a schematic diagram of an embodiment of a memory allocation method according to this application.
Figure 9B:
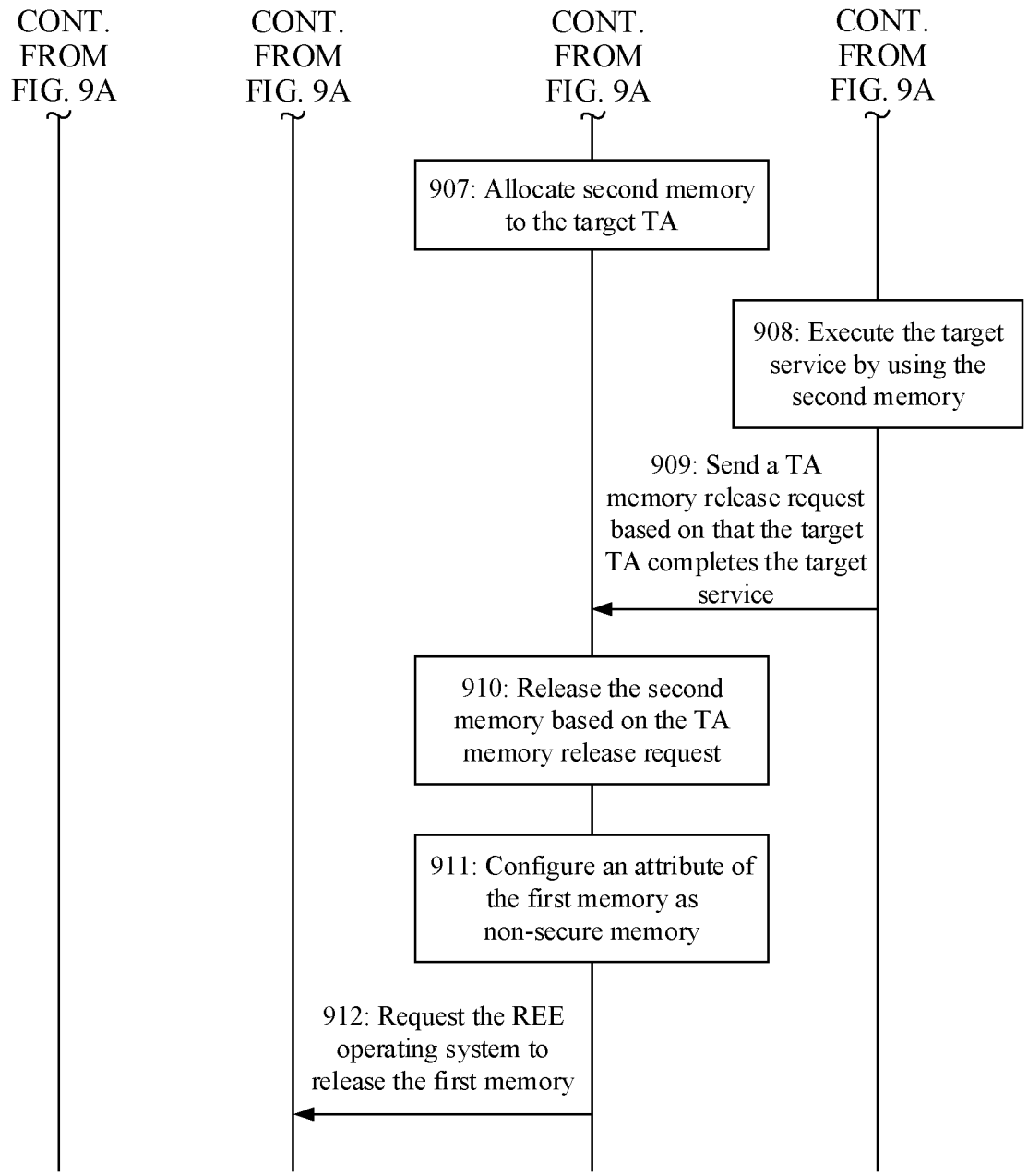

To resolve the foregoing problems, this application provides a memory allocation method. Referring to FIG. 9A and FIG. 9B, an embodiment of a memory allocation method in this application may include the following steps.

901: A target TA obtains a running request of a target service sent by a target CA.

902: The target TA sends a TA memory request to a TEE operating system.

The TA memory request may be used to apply for memory required by the target service.

903: The TEE operating system determines, based on the TA memory request, whether there is sufficient available system memory in the TEE operating system; and if no, performs step 904; or if yes, performs step 907.

904: The TEE operating system sends a TEE memory request to an REE operating system, where a size of memory applied for based on the TEE memory request is not less than that of memory applied for based on the TA memory request.

Alternatively, a size of memory applied for based on the TEE memory request is determined based on a size of available secure memory and a size of memory applied for based on the TA memory request.

905: The REE operating system transfers address information of first memory to the TEE operating system based on the TEE memory request.

The REE operating system may send memory allocation information to the TEE operating system, where the memory allocation information is used to indicate that memory allocated by the TEE operating system is the first memory. In this embodiment of this application, an example in which the memory allocation information is the address information of the first memory is used.

906: The TEE operating system configures an attribute of the first memory as secure memory.

907: The TEE operating system allocates second memory to the target TA, where a size of the second memory is not less than the memory applied for based on the TA memory request.

908: The target TA executes the target service by using the second memory.

909: The target TA sends a TA memory release request to the TEE operating system based on that the target TA completes the target service, where the TA memory release request includes address information of the second memory.

910: The TEE operating system releases the second memory based on the TA memory release request.

911: Based on that the first memory is free, the TEE operating system configures the attribute of the first memory as non-secure memory.

912: The TEE operating system requests the REE operating system to release the first memory.

The TEE operating system needs to return the first memory (that is, steps 911 and 912 are performed). If the first memory is greater than the second memory, the TEE operating system may return the first memory at a time, or may return the first memory for a plurality of times.

About returning the second memory by the TEE operating system, the TEE operating system may return the second memory immediately after step 910 (that is, steps 911 and 912 are performed). Alternatively, the TEE operating system may delay returning the second memory. For example, the TEE operating system may determine whether secure memory transferred in the REE/or available secure memory is sufficient; and if the secure memory transferred in the REE/or the available secure memory is sufficient, return the second memory immediately; otherwise, do not return the secure memory temporarily. Alternatively, the TEE operating system may reserve the second memory for specific duration, and return the second memory if the second memory is not used within the duration.

This embodiment of this application helps resolve a problem of instability caused when the CA applies for memory for the TA, and helps reduce complexity of a dynamic expansion solution of TEE memory.

The embodiment corresponding to FIG. 9A and FIG. 9B is merely used as an example. In an actual application, none or some of steps 901, 902, 903, and 907 to 912 may be performed based on a requirement.

The foregoing mainly describes the solutions provided in the embodiments of this application from a perspective of interaction between the target CA, the REE operating system, the TEE operating system, and the target TA in a computer system. It may be understood that, to implement the foregoing functions, the target CA, the REE operating system, the TEE operating system, and the target TA include corresponding hardware structures and/or software modules for performing the functions. It may be also understood that, in combination with the functions described in the embodiments disclosed in this specification, this application can be implemented by hardware or a combination of hardware and computer software. Whether a specific function is implemented by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of functional modules, a person skilled in the art may separately perform functional module division on the target CA, the REE operating system, the TEE operating system, and the target TA according to the foregoing method embodiments. For example, division into the functional modules is performed in correspondence with the functions. Alternatively, two or more functions may be integrated into one functional module. The foregoing integrated functional module may be implemented in a form of hardware, or may be implemented in a form of a software functional unit.

Figure 10:
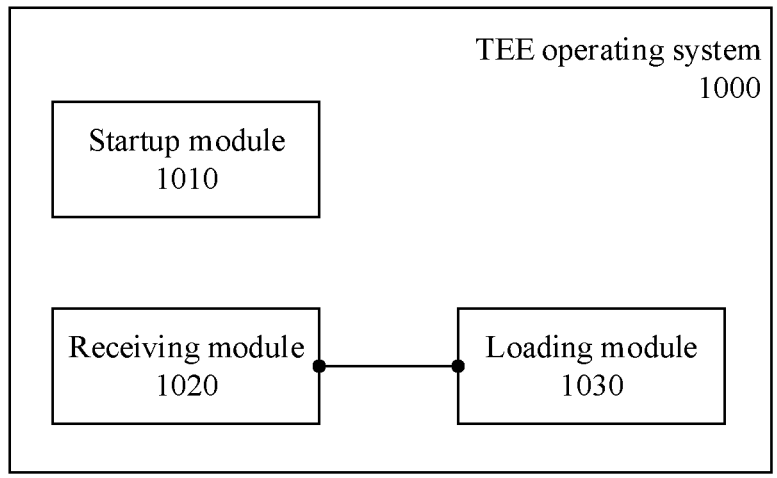
FIG. 10 is a schematic diagram of an embodiment of a TEE operating system according to this application.

For example, according to the solution provided in the first aspect of the summary, when division into the functional units is performed in an integrated manner, FIG. 10 is a schematic structural diagram of a TEE operating system. As shown in FIG. 10, an embodiment of a TEE operating system 1000 in this application may include: a startup module 1010 configured to start a target TA, where the target TA is any TA in one or more TAs; a receiving module 1020 configured to receive a loading request sent by the target TA in response to a running request of a target service, where the loading request is used to indicate to load a target dynamic library, and the target service is a service provided by the target TA; and a loading module 1030 configured to load the target dynamic library to memory space of the target TA in response to the loading request, where the target dynamic library is used to support running of the target service.

In a possible implementation, the loading module 1030 is configured to: load the target dynamic library from memory space of the TEE operating system to the memory space of the target TA.

In a possible implementation, the loading module 1030 includes: a TEE communications unit configured to obtain the target dynamic library from an REE operating system; and a dynamic library loading unit configured to load the target dynamic library to the memory space of the target TA.

In a possible implementation, the TEE communications unit is configured to: send a transfer request of the target dynamic library to the REE operating system, where the transfer request includes an identifier of the target dynamic library, and the transfer request is used to indicate the REE operating system to send the target dynamic library to the TEE operating system; and receive the target dynamic library sent by the REE operating system.

In a possible implementation, the TEE communications unit is configured to: obtain an encrypted file from the REE operating system; and decrypt the encrypted file to obtain a decrypted file, where the decrypted file includes the target dynamic library.

In a possible implementation, the startup module 1010 is configured to: obtain one or more dynamic libraries from the REE operating system, and store the one or more dynamic libraries into the memory space of the TEE operating system, where the one or more dynamic libraries are recorded in a target file of the target TA. The target file is an executable file of the target TA.

In a possible implementation, the loading module 1030 is configured to: determine, based on target permission information, whether the target TA has permission to invoke the target dynamic library; and load the target dynamic library to the memory space of the target TA based on that the target TA has permission to invoke the target dynamic library.

In a possible implementation, the TEE operating system further includes a TEE memory module, and the TEE memory module is configured to: obtain a memory request sent by the target TA in response to the running request of the target service, where the memory request is used to apply to the TEE operating system for memory required for running the target service; obtain memory allocation information from the REE operating system in response to the memory request, where the memory allocation information is used to indicate the REE operating system to allocate first memory to the TEE operating system; and allocate the first memory to the target TA.

In a possible implementation, the TEE memory module is configured to: configure the first memory as secure memory; and allocate, to the target TA, the first memory configured as the secure memory.

In a possible implementation, the TEE memory module is further configured to: after allocating the first memory to the target TA, receive a TA memory release request sent by the target TA, where the TA memory release request is used to request the TEE operating system to release the first memory; and release the first memory in response to the TA memory release request.

In a possible implementation, the TEE memory module is configured to: configure the first memory as non-secure memory; and release the first memory configured as the non-secure memory.

In a possible implementation, the TEE memory module is further configured to: after releasing the first memory, send a TEE memory release request to the REE operating system, where the TEE memory release request is used to request the REE operating system to release the first memory.

Figure 11:
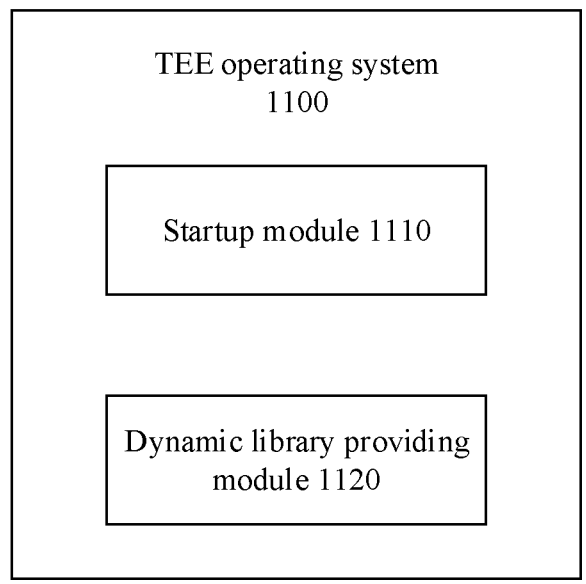
FIG. 11 is a schematic diagram of another embodiment of a TEE operating system according to this application.

For example, according to the solution provided in the second aspect of the summary, when division into the functional units is performed in an integrated manner, FIG. 11 is a schematic structural diagram of a TEE operating system. As shown in FIG. 11, another embodiment of a TEE operating system 1100 in this application may include: a startup module 1110 configured to start a target TA, where the target TA is any TA in one or more TAs; and a dynamic library providing module 1120 configured to provide a target dynamic library for the target TA, where the target dynamic library is loaded by the target TA to memory space of the target TA, to support the target TA in running a target service, and the target service is a service provided by the target TA.

In a possible implementation, the dynamic library providing module 1120 includes: an obtaining request receiving unit configured to receive an obtaining request sent by the target TA in response to a running request of the target service, where the obtaining request is used to indicate the TEE operating system to obtain the target dynamic library; and a dynamic library obtaining unit configured to obtain the target dynamic library in response to the obtaining request.

In a possible implementation, the dynamic library obtaining unit is configured to obtain the target dynamic library from an REE operating system.

In a possible implementation, the dynamic library obtaining unit is configured to: send a transfer request of the target dynamic library to the REE operating system, where the transfer request includes an identifier of the target dynamic library, and the transfer request is used to indicate the REE operating system to send the target dynamic library to the TEE operating system; and receive the target dynamic library sent by the REE operating system.

In a possible implementation, the dynamic library obtaining unit is configured to: obtain an encrypted file from the REE operating system; and decrypt the encrypted file to obtain a decrypted file, where the decrypted file includes the target dynamic library.

In a possible implementation, the dynamic library providing module 1120 is configured to: receive the target dynamic library sent by the REE operating system in response to a second transfer request, where a running request of the target service is sent by a target client application CA deployed on the REE operating system, the target CA has permission to invoke the target service, the second transfer request is sent to the REE operating system by the target CA in response to a first transfer request, and the first transfer request is sent to the target CA by the target TA in response to the running request of the target service.

In a possible implementation, the startup module 1110 includes: obtaining one or more dynamic libraries from the REE operating system, and storing the one or more dynamic libraries into memory space of the TEE operating system, where the one or more dynamic libraries are recorded in a target file of the target TA. Optionally, the target file is an executable file of the target TA.

In a possible implementation, the dynamic library providing module 1120 includes: an access request receiving unit configured to receive an access request sent by the target TA, where the access request is used to request to access the memory space of the TEE operating system, and the target dynamic library is stored in the memory space of the TEE operating system; and an allowed-information sending unit configured to send access-allowed information to the target TA based on that the target TA has permission to access the memory space of the TEE operating system, where the access-allowed information is used to notify the target TA to access the memory space of the TEE operating system.

In a possible implementation, the access request is used to request to access the target dynamic library; and the allowed-information sending unit is configured to: send response information to the target TA based on that the target TA has permission to access the memory space of the TEE operating system and that the target TA has permission to invoke the target dynamic library.

Figure 12:
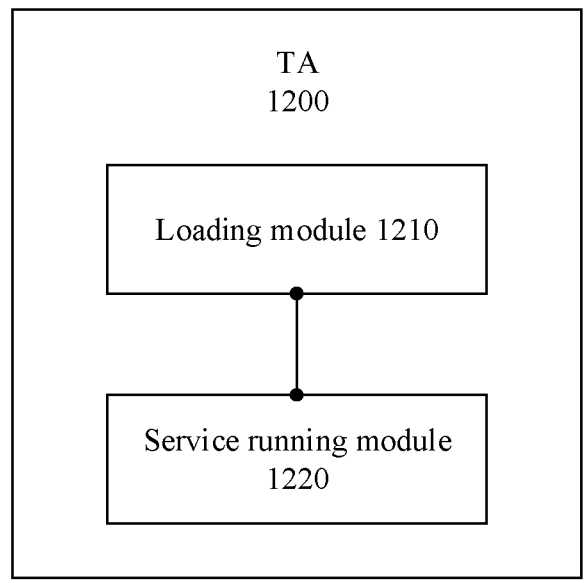
FIG. 12 is a schematic diagram of an embodiment of a TA according to this application.

For example, according to the solution provided in the third aspect of the summary, when division into the functional units is performed in an integrated manner, FIG. 12 is a schematic structural diagram of a TA. The TA in this embodiment corresponds to the target TA in the foregoing method embodiments. As shown in FIG. 12, an embodiment of a TA 1200 in this application may include: a loading module 1210 configured to load a target dynamic library to memory space of a target TA in response to a running request of a target service, where the target TA is any TA in one or more TAs, and the target service is a service provided by the target TA; and a service running module 1220 configured to run the target service by using the target dynamic library.

In a possible implementation, the target dynamic library is provided by the TEE operating system to the target TA.

In a possible implementation, the loading module 1210 is configured to: send an obtaining request to the TEE operating system, where the obtaining request is used to request the TEE operating system to obtain the target dynamic library; and load, to the memory space of the target TA, the target dynamic library obtained by the TEE operating system.

In a possible implementation, the target dynamic library is obtained by the TEE operating system from the REE operating system.

In a possible implementation, the loading module 1210 is configured to: send a first transfer request to a target client application CA, where the target CA is deployed on the REE operating system and has permission to invoke the target service, and the running request of the target service is sent by the target CA; and load, to the memory space of the target TA, the target dynamic library received by the TEE operating system, where the target dynamic library is sent to the TEE operating system by the REE operating system in response to a second transfer request, and the second transfer request is sent to the REE operating system by the target CA in response to the first transfer request.

In a possible implementation, the loading module 1210 is configured to: load the target dynamic library from memory space of the TEE operating system to the memory space of the target TA.

In a possible implementation, the loading module 1210 is configured to: send an access request to the TEE operating system, where the access request is used to request to access the memory space of the TEE operating system, and the target dynamic library is stored in the memory space of the TEE operating system; and access the target dynamic library in the memory space of the TEE operating system based on received access-allowed information sent by the TEE operating system, and load the target dynamic library to the memory space of the target TA.

Figure 13:
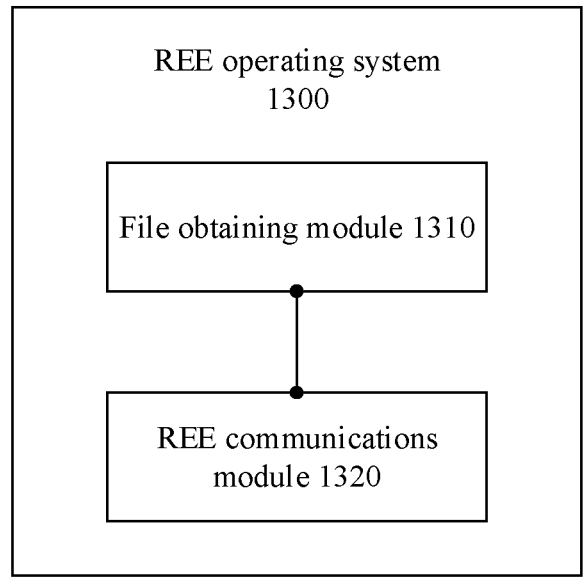
FIG. 13 is a schematic diagram of an embodiment of an REE operating system according to this application.

For example, according to the solution provided in the fourth aspect of the summary, when division into the functional units is performed in an integrated manner, FIG. 13 is a schematic structural diagram of an REE operating system 1300. As shown in FIG. 13, an embodiment of an REE operating system 1300 in this application may include: a file obtaining module 1310 configured to obtain a target file in response to a transfer request, where the transfer request is used to indicate the REE operating system to transfer the target file to the TEE operating system; and an REE communications module 1320 configured to send the target file to the TEE operating system.

In a possible implementation, the target file is a target dynamic library, the target dynamic library is used to be loaded to memory space of a target TA, to support the target TA in running a target service, the target service is a service provided by the target TA, and the target TA is any TA in one or more TAs deployed on the TEE operating system.

In a possible implementation, the transfer request is sent by the TEE operating system, or the transfer request is sent by a target client application CA, and the target CA has permission to invoke the target service.

Figure 14:
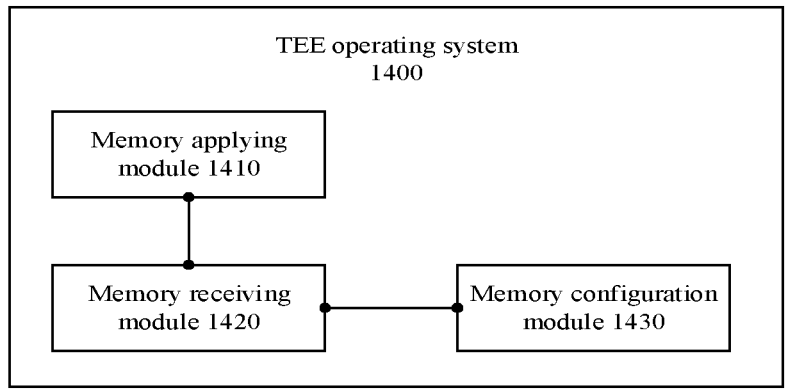
FIG. 14 is a schematic diagram of another embodiment of a TEE operating system according to this application.

For example, according to the solution provided in the fifth aspect of the summary, when division into the functional units is performed in an integrated manner, FIG. 14 is a schematic structural diagram of a TEE operating system 1400. As shown in FIG. 14, another embodiment of a TEE operating system 1400 in this application may include: a memory applying module 1410 configured to send a first memory request to an REE operating system, where the first memory request is used to request the REE operating system to allocate memory to the TEE operating system; a memory receiving module 1420 configured to receive memory allocation information sent by the REE operating system, where the memory allocation information is used to indicate that the memory allocated to the TEE operating system 1400 is target memory; and a memory configuration module 1430 configured to configure the target memory as secure memory.

In a possible implementation, the memory applying module 1410 is further configured to: before sending the first memory request to the REE operating system, obtain a second memory request sent by a target TA, where the target TA is any TA in one or more TAs deployed on the TEE operating system 1400, and the second memory request is used to apply to the TEE operating system 1400 for memory.

In a possible implementation, the memory configuration module 1430 is further configured to: after configuring the target memory as the secure memory, allocate the target memory to the target TA.

In a possible implementation, the second memory request is sent by the target TA in response to a running request of a target service, the second memory request is used to apply for memory required by the target TA for running the target service, and the target service is a service provided by the target TA.

In a possible implementation, memory applied for by the first memory request is greater than the memory applied for by the second memory.

In a possible implementation, the memory applying module 1410 is further configured to: after the memory configuration module 1430 allocates the first memory to the target TA, receive a TA memory release request sent by the target TA, where the TA memory release request is used to request the TEE operating system 1400 to release the target memory.

The memory applying module 1410 is further configured to release the target memory in response to the TA memory release request.

In a possible implementation, the memory configuration module 1430 is further configured to: after the memory configuration module 1430 releases the target memory, configure the target memory as non-secure memory.

The memory applying module is further configured to send a TEE memory release request to the REE operating system, where the TEE memory release request is used to request the REE operating system to release the target memory.

An embodiment of this application further provides a computer system. The computer system may run the method in any one of the embodiments provided in this application, and includes a corresponding hardware structure and/or software module for performing each function. Additionally, it should be understood that the computer system in this application can implement, in a form of hardware or a combination of hardware and computer software, the functions described with reference to the embodiments disclosed in this specification. Whether a specific function is implemented by hardware or hardware driven by computer software depends on particular applications and design constraints of the technical solutions. A person skilled in the art may use different methods to implement the described functions for each particular application, but it should not be considered that the implementation goes beyond the scope of this application.

From a perspective of functional modules, a person skilled in the art may divide the computer system into functional modules according to the foregoing method embodiments. For example, division into the functional modules may be performed in correspondence with the functions. Alternatively, two or more functions may be integrated into one functional module. The foregoing integrated functional module may be implemented in a form of hardware, or may be implemented in a form of a software functional unit.

For example, the computer operating system provided in this application may include one or more of the foregoing REE operating system, the foregoing TEE operating system, the foregoing CA, and the foregoing TA.

The apparatuses provided in the embodiments of this application may be configured to perform the methods in the foregoing corresponding embodiments. Therefore, for technical effects that can be obtained by the apparatus embodiments of this application, refer to the foregoing corresponding method embodiments. Details are not described herein again.

Figure 15:
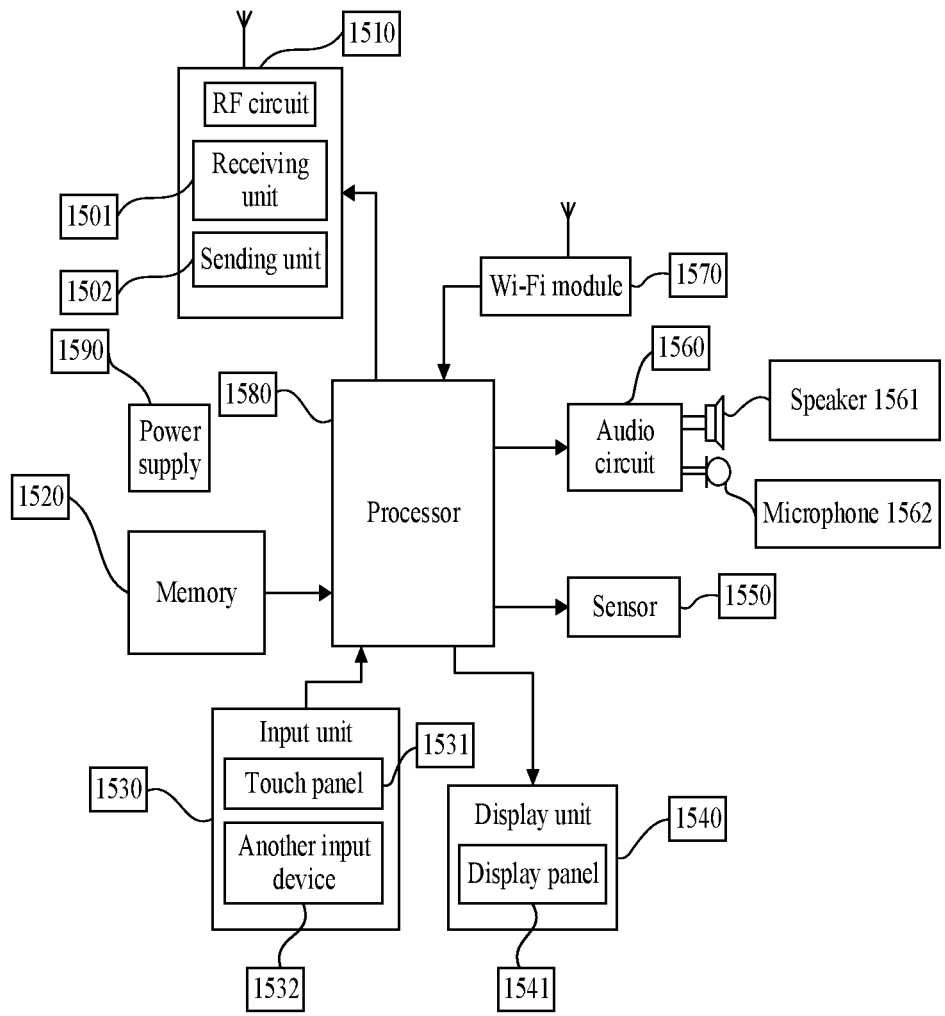
FIG. 15 is a schematic diagram of an embodiment of a computer device according to this application.

Each of the foregoing "modules" may refer to an application-specific integrated circuit (ASIC), a processor and a memory for executing one or more software or firmware programs, an integrated logic circuit, and/or another component that can provide the foregoing functions. FIG. 15 is a schematic structural diagram of hardware of a computer device 1500. In a simple embodiment, a person skilled in the art may figure out that the foregoing TEE operating system, the foregoing REE operating system, the foregoing TA, the foregoing CA, or the foregoing operating system may use the form shown in FIG. 15.

The computer device 1500 may include a processor radio frequency (RF) circuit 1510, a memory 1520, an input unit 1530, a display unit 1540, a sensor 1550, an audio circuit 1560, a Wi-Fi module 1570, a processor 1580, a power supply 1590, and the like.

It can be understood by a person skilled in the art that a structure of the computer device 1500 shown in FIG. 15 does not constitute any limitation to the computer device, and the computer device may include more or fewer components than those shown in the figure, or combine some components, or have different component arrangements.

Constituent parts of the computer device 1500 are described in the following with reference to FIG. 15.

The RF circuit 1510 may be configured to: receive and send a signal in an information receiving/sending process or a call process. In particular, after receiving downlink information from a network-side device, the RF circuit 1510 sends the downlink information to the processor 1580 for processing. In addition, the RF circuit 1510 sends designed uplink data to the network-side device.

The RF circuit 1510 usually includes but is not limited to an antenna, at least one amplifier, a transceiver, a coupler, a low-noise amplifier (LNA), a duplexer, and the like.

In addition, the RF circuit 1510 may further communicate with a network and another device through wireless communication.

Any communications standard or protocol may be used for the wireless communication, and includes but is not limited to a Global System for Mobile Communications (GSM), a General Packet Radio Service (GPRS) system, a code-division multiple access (CDMA) system, a wideband code-division multiple access (WCDMA) system, a Long-Term Evolution (LTE) system, an email, a short message service (SMS), and the like.

The memory 1520 may be configured to store a software program and a module. The processor 1580 runs the software program and the module stored in the memory 1520, to perform various function applications of the computer device 1500 and process data.

The memory 1520 may mainly include a program storage area and a data storage area. The program storage area may store an operating system and an application required by at least one function. The data storage area may store data created based on use of the computer device 1500, and the like. In addition, the memory 1520 may include a high-speed random-access memory, and may further include a non-volatile memory, for example, at least one magnetic disk storage device, a flash memory device, or another volatile solid-state storage device.

The input unit 1530 may be configured to: receive input digit or character information, and generate a key signal input related to a user setting and function control of the computer device 1500.

For example, the input unit 1530 may include a touch control panel 1531 and another input device 1532. The touch control panel 1531, also referred to as a touchscreen, may collect a touch operation (for example, an operation performed by a user on the touch control panel 1531 or near the touch control panel 1531 by using any proper object or accessory such as a finger or a stylus) performed by the user on or near the touch control panel, and drive a corresponding connection apparatus based on a preset program. In addition to the touch control panel 1531, the input unit 1530 may further include the other input device 1532. For example, the other input device 1532 may include but is not limited to one or more of a physical keyboard, a function key (for example, a volume control press key or a power on/off press key), a trackball, a mouse, a joystick, and the like.

The display unit 1540 may be configured to display information input by the user or information provided for the user, and various menus of the computer device 1500. The display unit 1540 may include a display panel 1541. Optionally, the display panel 1541 may be configured in a form of a liquid crystal display (LCD), an organic light-emitting diode (OLED), or the like. Further, the touch control panel 1531 may cover the display panel 1541. When detecting a touch operation on or near the touch control panel 1531, the touch control panel 1531 transmits the touch operation to the processor 1580 to determine a type of a touch event. Then, the processor 1580 provides corresponding visual output on the display panel 1541 based on the type of the touch event. In FIG. 15, the touch control panel 1531 and the display panel 1541 are used as two independent components to implement input and input functions of the computer device. However, in some embodiments, the touch control panel 1531 and the display panel 1541 may be integrated to implement the input and output functions of the computer device.

The computer device may further include at least one sensor 1550, such as a light sensor, a motion sensor, and another sensor. For example, the light sensor may include an ambient light sensor and a proximity sensor. The ambient light sensor may adjust brightness of the display panel 1541 according to luminance of ambient light, and the proximity sensor may disable the display panel 1541 and/or backlight when the computer device approaches an ear. As a type of motion sensor, the acceleration sensor can detect a value of an acceleration in each direction (usually in three axes), and detect a value and a direction of gravity when the acceleration sensor is static, and is applicable to an application for recognizing a computer device posture (for example, switching between a landscape screen and a portrait screen, related games, or magnetometer posture calibration), a function related to vibration recognition (such as a pedometer or a knock), and the like. Other sensors such as a gyroscope, a barometer, a hygrometer, a thermometer, and an infrared sensor may also be disposed on the computer device. Details are not described herein.

The audio circuit 1560, a loudspeaker 1561, and a microphone 1562 may provide an audio interface between the user and the computer device 1500. The audio circuit 1560 may transmit, to the loudspeaker 1561, an electrical signal that is obtained through conversion of received audio data, and the loudspeaker 1561 converts the electrical signal into an acoustic signal and outputs the acoustic signal. In addition, the microphone 1562 converts a collected an acoustic signal into an electrical signal, the audio circuit 1560 receives the electrical signal, converts the electrical signal into audio data, and outputs the audio data to the processor 1580 for processing, and then processed audio data is sent to, for example, another device, by using the RF circuit 1510, or the audio data is output to the memory 1520 for further processing.

Wi-Fi is a short distance wireless transmission technology. The computer device 1500 may help, by using the Wi-Fi module 1570, the user receives and sends emails, browse a web page, access streaming media, and the like, to provide wireless broadband internet access for the user. Although FIG. 15 shows the Wi-Fi module 1570, it may be understood that the Wi-Fi module 1570 is not a necessary part of the computer device, and may be omitted based on a requirement without changing the essence of the present disclosure.

The processor 1580 is a control center of the computer device 1500, and is connected to each part of the entire computer device 1500 through various interfaces and lines. The processor 1580 performs various functions of the computer device 1500, and processes data, by running or executing the software program and/or the module that are/is stored in the memory 1520 and invoking data stored in the memory 1520, in order to perform overall monitoring on the computer device 1500. The processor 1580 may be a central processing unit (CPU), a network processor (NP), or a combination of a CPU and an NP, a digital signal processor (DSP), or an application-specific integrated circuit (ASIC), a field-programmable gate array (FPGA) or another programmable logic device, a discrete gate or transistor logic device, or a discrete hardware component. The methods, the steps, and logical block diagrams that are disclosed in this application may be implemented. The general-purpose processor may be a microprocessor, or the processor may be any conventional processor or the like. Steps of the methods disclosed in this application may be directly executed and completed by a hardware decoding processor, or may be executed and completed by a combination of hardware and software modules in the decoding processor. A software module may be located in a storage medium mature in the art, such as a random-access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. Although only one processor is shown in the figure, the apparatus may include a plurality of processors, or the processor includes a plurality of processing units. For example, the processor may be a single-core processor, or may be a multi-core or many-core processor. The processor may be an ARM architecture processor. Optionally, the processor 1580 may integrate an application processor and a modem processor. The application processor mainly processes an operating system, a user interface, an application, and the like. The modem processor mainly processes wireless communication. It may be understood that the foregoing modem processor may alternatively not be integrated into the processor 1580.

The computer device 1500 further includes the power supply 1590 (for example, a battery) that supplies power to the components. Preferably, the power supply 1590 may be logically connected to the processor 1580 by using a power management system, to implement functions, such as charge management, discharge management, and power consumption management, by using the power management system.

Although not shown in the figure, the computer device 1500 may further include a camera, a Bluetooth module, and the like, and details are not described herein.

The computer device 1500 provided in the embodiments of this application may be a mobile phone, a tablet computer, a desktop computer, a wearable device (for example, a smart watch), a smart home device (for example, a smart stereo or a smart television), a vehicle-mounted smart device, a driverless device, a virtual reality device, an augmented reality device, a mixed reality device, an artificial intelligence device, or the like.

All or some of the foregoing embodiments may be implemented through software, hardware, firmware, or any combination thereof. When the software is used for implementation, all or some of the foregoing embodiments may be implemented in a form of a computer program product.

The computer program product includes one or more computer instructions. When the computer executable instructions are loaded and executed on the computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD) or solid state disk), or the like.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of this application. In addition, the terms "include", "contain" and any other variants mean to cover the non-exclusive inclusion, such that a process, method, system, product, or device that includes a series of units is not necessarily limited to those units, but may include other units not expressly listed or inherent to such a process, method, system, product, or device. In the embodiments of this application, "a plurality of" refers to two or more than two.

In addition, in the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a relative concept in a specific manner.

For understanding, in the embodiments of this application, a plurality of examples are provided. However, these examples are merely examples, and are not meant to be a best implementation of this application.

The technical solutions provided in this application are described in detail above. The principle and implementation of this application are described herein through examples. The description about the embodiments is merely provided to help understand the method and core ideas of this application. In addition, a person of ordinary skill in the art can make variations and modifications to this application in terms of the implementations and application scopes according to the ideas of this application. Therefore, the content of specification shall not be construed as a limit to this application.

What is claimed is:

1. A trusted application (TA) running method applied to a computer system, wherein a rich execution environment (REE) and a trusted execution environment (TEE) are deployed in the computer system, wherein an REE operating system is deployed in the REE, wherein a TEE operating system is deployed in the TEE, wherein one or more trusted applications (TAs) are deployed on the TEE operating system, and wherein the TA running method comprises:
 starting a target TA in the one or more TAs;
 receiving a loading request from the target TA in response to a running request of a target service, wherein the loading request indicates to load a target dynamic library, wherein the target service is provided by the target TA, wherein the running request of the target service is from a target client application (CA) deployed on the REE operating system, wherein the target CA has permission to invoke the target service, wherein the TEE operating system receives the target dynamic library in response to a second transfer request, wherein the second transfer request is sent to the REE operating system by the target CA in response to a first transfer request, and wherein the first transfer request is sent to the target CA by the target TA in response to the running request of the target service; and
 loading the target dynamic library to memory space of the target TA in response to the loading request,
 wherein the target dynamic library is configured to support running of the target service.

2. The TA running method of claim 1, wherein loading the target dynamic library comprises loading the target dynamic library from a first memory space of the TEE operating system to the memory space of the target TA.

3. The TA running method of claim 1, wherein loading the target dynamic library comprises:
 obtaining the target dynamic library from the REE operating system, and
 loading the target dynamic library to the memory space of the target TA.

4. The TA running method of claim 3, wherein obtaining the target dynamic library comprises:
 sending a transfer request of the target dynamic library to the REE operating system, wherein the transfer request comprises an identifier of the target dynamic library, and wherein the transfer request indicates to the REE operating system to send the target dynamic library to the TEE operating system; and
 receiving the target dynamic library from the REE operating system.

5. The TA running method of claim 3, wherein obtaining the target dynamic library comprises:
 obtaining an encrypted file from the REE operating system; and
 decrypting the encrypted file to obtain a decrypted file, wherein the decrypted file comprises the target dynamic library.

6. The TA running method of claim 1, wherein starting the target TA comprises:
 obtaining one or more dynamic libraries from the REE operating system; and
 storing the one or more dynamic libraries into the memory space of the TEE operating system, wherein the one or more dynamic libraries are recorded in a target file of the target TA.

7. The TA running method of claim 1, wherein loading the target dynamic library comprises:
 loading the target dynamic library to the memory space of the target TA when the target TA has permission to invoke the target dynamic library, wherein whether the target TA has permission to invoke the target dynamic library is based on target permission information.

8. The TA running method of claim 1, further comprising:
 obtaining a memory request from the target TA in response to the running request of the target service, wherein the memory request is to apply to the TEE operating system for memory required for running the target service;
 obtaining memory allocation information from the REE operating system in response to the memory request, wherein the memory allocation information instructs the REE operating system to allocate first memory to the TEE operating system; and
 allocating the first memory to the target TA.

9. The TA running method of claim 8, wherein the first memory is greater than the memory applied by the memory request.

10. The TA running method of claim 8, wherein allocating the first memory to the target TA comprises:
 configuring the first memory as secure memory; and
 allocating, to the target TA, the first memory configured as the secure memory.

11. The TA running method of claim 8, wherein after allocating the first memory to the target TA, the TA running method further comprises:
 receiving a TA memory release request from the target TA, wherein the TA memory release request requests the TEE operating system to release the first memory; and
 releasing the first memory in response to the TA memory release request.

12. The TA running method of claim 11, wherein releasing the first memory comprises:
 configuring the first memory as non-secure memory; and
 releasing the first memory configured as the non-secure memory.

13. The TA running method of claim 11, wherein after releasing the first memory, the TA running method further comprises sending a TEE memory release request to the REE operating system, and wherein the TEE memory release request requests the REE operating system to release the first memory.

14. A computer device in which a rich execution environment (REE) and a trusted execution environment (TEE) are deployed, wherein an REE operating system is deployed in the REE and a TEE operating system is deployed in the TEE, wherein one or more trusted applications (TAs) are deployed on the TEE operating system, and wherein the computer device comprises:

a memory configured to store instructions; and one or more processors coupled to the memory and configured to execute the instructions to:

start a target TA in the one or more TAs;

receive a loading request from the target TA in response to a running request of a target service, wherein the loading request indicates to load a target dynamic library, wherein the target service is a service provided by the target TA, wherein the running request of the target service is from a target client application (CA) deployed on the REE operating system, wherein the target CA has permission to invoke the target service, wherein the TEE operating system receives the target dynamic library in response to a second transfer request, wherein the second transfer request is sent to the REE operating system by the target CA in response to a first transfer request, and wherein the first transfer request is sent to the target CA by the target TA in response to the running request of the target service; and load the target dynamic library to memory space of the target TA in response to the loading request, wherein the target dynamic library is configured to support running of the target service.

15. The computer device of claim 14, wherein loading the target dynamic library comprises loading the target dynamic library from a first memory space of the TEE operating system to the memory space of the target TA.

16. The computer device of claim 14, wherein loading the target dynamic library comprises:

obtaining the target dynamic library from the REE operating system, and loading the target dynamic library to the memory space of the target TA.

17. The computer device of claim 16, wherein obtaining the target dynamic library comprises:

obtaining an encrypted file from the REE operating system; and decrypting the encrypted file to obtain a decrypted file, wherein the decrypted file comprises the target dynamic library.

18. A non-transitory computer-readable storage medium, comprising instructions executable by one or more processors of a computer device, wherein a rich execution environment (REE) and a trusted execution environment (TEE) are deployed in the computer device, wherein an REE operating system is deployed in the REE and a TEE operating system is deployed in the TEE, wherein one or more trusted applications (TAs) are deployed on the TEE operating system, and wherein when the one or more processors execute the instructions, the computer device is configured to:

start a target TA in the one or more TAs;

receive a loading request from the target TA in response to a running request of a target service, wherein the loading request indicates to load a target dynamic library, wherein the target service is provided by the target TA, wherein the running request of the target service is from a target client application (CA) deployed on the REE operating system, wherein the target CA has permission to invoke the target service, wherein the TEE operating system receives the target dynamic library in response to a second transfer request, wherein the second transfer request is sent to the REE operating system by the target CA in response to a first transfer request, and wherein the first transfer request is sent to the target CA by the target TA in response to the running request of the target service; and load the target dynamic library to memory space of the target TA in response to the loading request, wherein the target dynamic library is configured to support running of the target service.

19. The non-transitory computer-readable storage medium of claim 18, wherein loading the target dynamic library comprises loading the target dynamic library from a first memory space of the TEE operating system to the memory space of the target TA.

20. The non-transitory computer-readable storage medium of claim 18, wherein loading the target dynamic library comprises:

obtaining the target dynamic library from the REE operating system; and loading the target dynamic library to the memory space of the target TA.

* * * * *

UNITED STATES PATENT AND TRADEMARK OFFICE
CERTIFICATE OF CORRECTION

| | | |
|---|---|---|
| PATENT NO. | : 12,118,128 B2 | Page 1 of 1 |
| APPLICATION NO. | : 17/682034 | |
| DATED | : October 15, 2024 | |
| INVENTOR(S) | : Jianxin Peng | |

It is certified that error appears in the above-identified patent and that said Letters Patent is hereby corrected as shown below:

In the Claims

Claim 5, Column 49, Line 67: "library comprises:" should read "library from the REE operating system comprises:"

Signed and Sealed this
Nineteenth Day of November, 2024

Katherine Kelly Vidal
*Director of the United States Patent and Trademark Office*